United States Patent [19]

Shioe et al.

[11] Patent Number: 5,390,132
[45] Date of Patent: Feb. 14, 1995

[54] DISTRIBUTED CONTROL SYSTEM HAVING A CONTROL UNIT TO DETECT AND CONTROL INTERRUPTION OF TRANSMISSION TO AND FROM REMOTE INPUT/OUTPUT DEVICES

[75] Inventors: Yasuhiko Shioe; Chuji Akiyama; Toshiaki Shirai; Hideyuki Sakamoto; Hitoshi Yasui; Makio Ishikawa; Hideo Matsukawa, all of Tokyo, Japan

[73] Assignee: Yokogawa Electric Corporation, Tokyo, Japan

[21] Appl. No.: 981,378

[22] Filed: Nov. 25, 1992

[30] Foreign Application Priority Data

Dec. 9, 1991 [JP] Japan .................................. 3-324333
Dec. 11, 1991 [JP] Japan .................................. 3-327692
Dec. 11, 1991 [JP] Japan .................................. 3-327694

[51] Int. Cl.$^6$ ........................................ G06K 15/00
[52] U.S. Cl. .................................................. 364/514
[58] Field of Search ................. 364/514; 395/575, 325

[56] References Cited

U.S. PATENT DOCUMENTS

| | | | |
|---|---|---|---|
| 4,546,429 | 10/1985 | Chan et al. ........................ | 395/325 |
| 4,601,012 | 7/1986 | Aiken, Jr. ........................... | 395/575 |
| 4,697,266 | 9/1987 | Finley ................................ | 395/575 |
| 4,945,474 | 7/1990 | Elliott et al. ....................... | 395/575 |
| 5,193,181 | 3/1993 | Barlow et al. ...................... | 395/575 |

Primary Examiner—Emanuel T. Voeltz
Assistant Examiner—Thomas Peeso
Attorney, Agent, or Firm—Moonray Kojima

[57] ABSTRACT

A distributed control system comprising a control station and a remote input/output device interconnected by a bus, wherein the system is provided with a continuation transmission service which first transmits an urgent output only and then performs cyclic scan transmission; an initialization start transmission service which first performs cyclic scan transmission for input only; an interruption duration measuring feature which measures the period of transmission interruption; and a control feature which activates the continuation transmission service when the result of the measurement is shorter than a predetermined period of time, and which activates the initialization start transmission service when the result of the measurement is longer than the predetermined period of time. Thus, for example, after a power supply failure, the system can rapidly recover and shift to normal process controlling operation without the delays normally experienced by prior control systems.

12 Claims, 18 Drawing Sheets

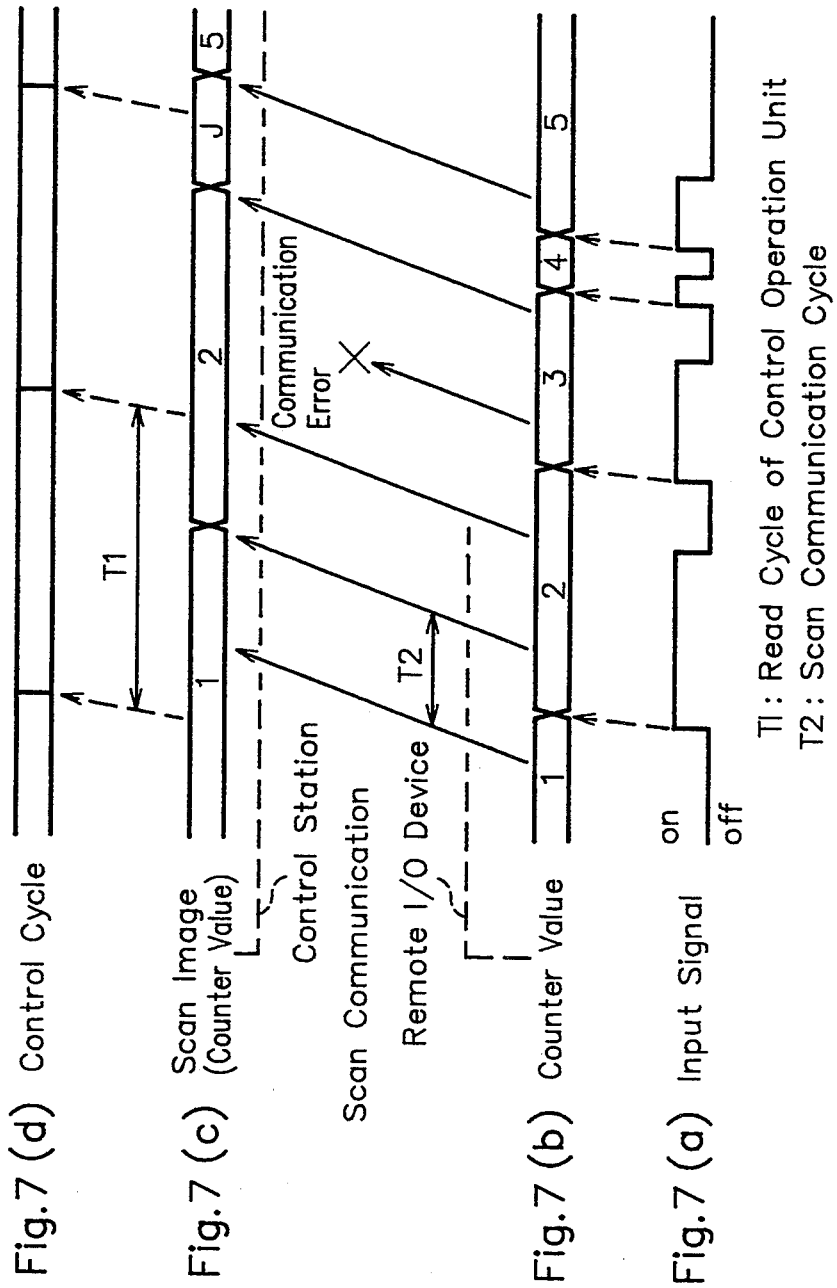

Fig.13
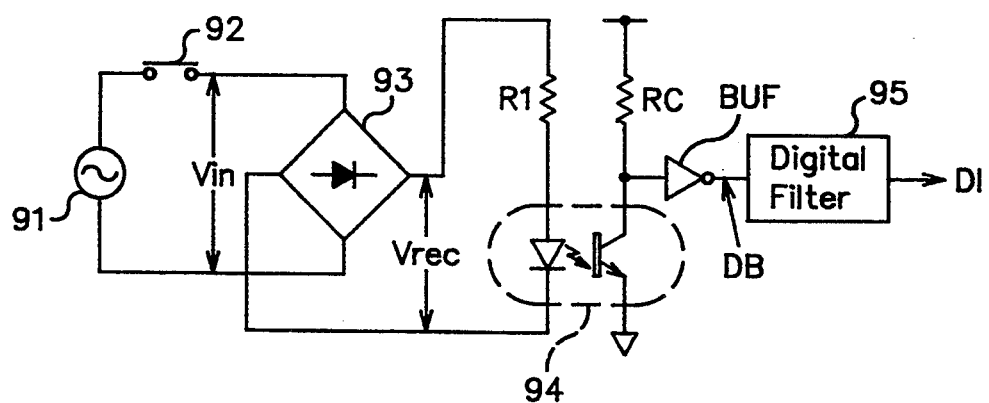
Fig.14 (a) Vin 
Fig.14 (b) Vrec 
Fig.14 (c) DB 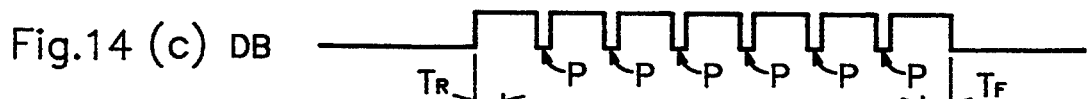
Fig.14 (d) DI 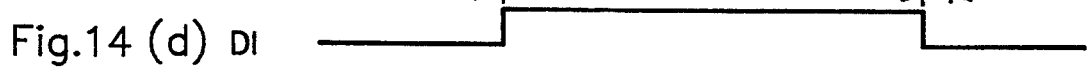

Fig.15
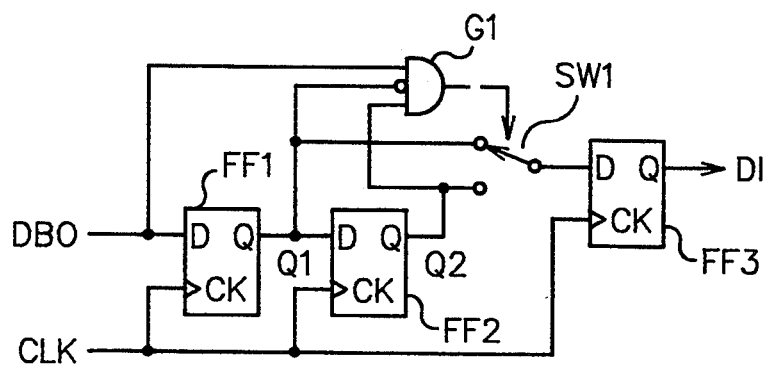
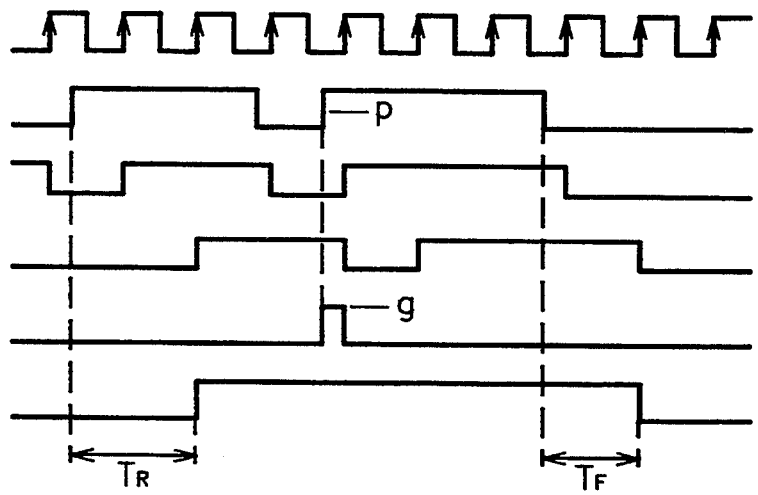
Fig.17
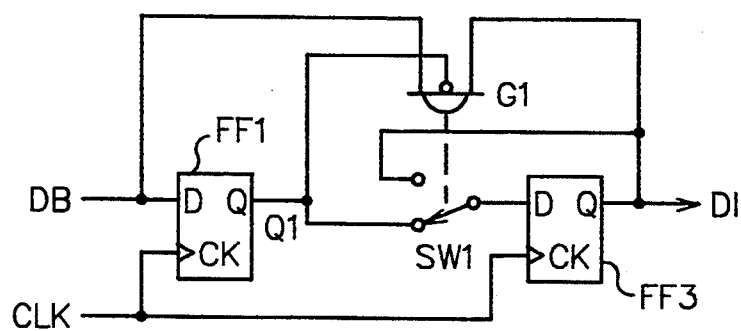

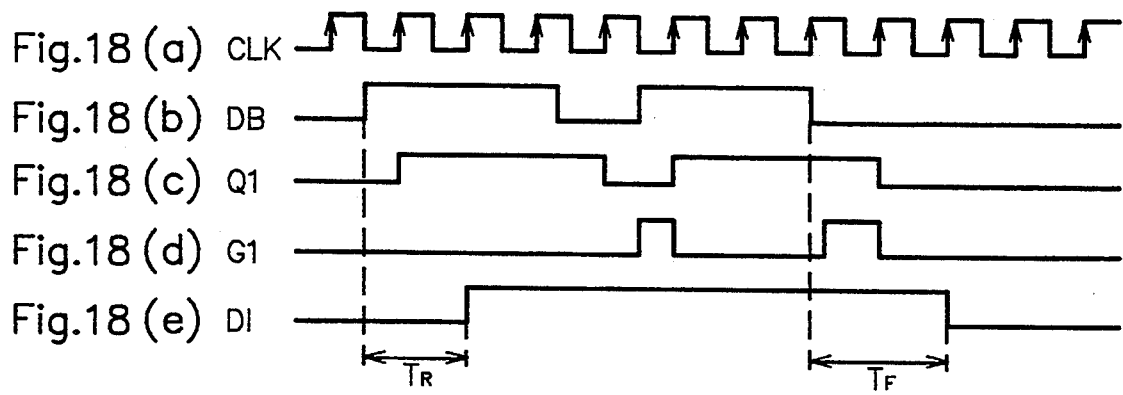
Fig.18 (a) CLK
Fig.18 (b) DB
Fig.18 (c) Q1
Fig.18 (d) G1
Fig.18 (e) DI
Fig.19
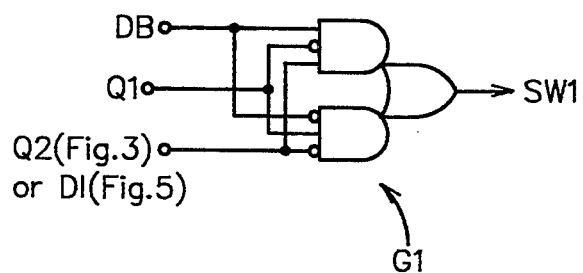
Fig.20
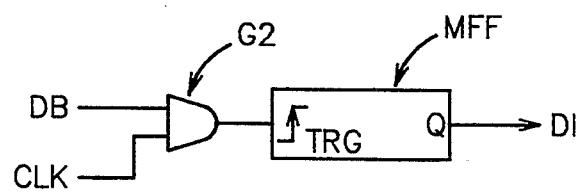

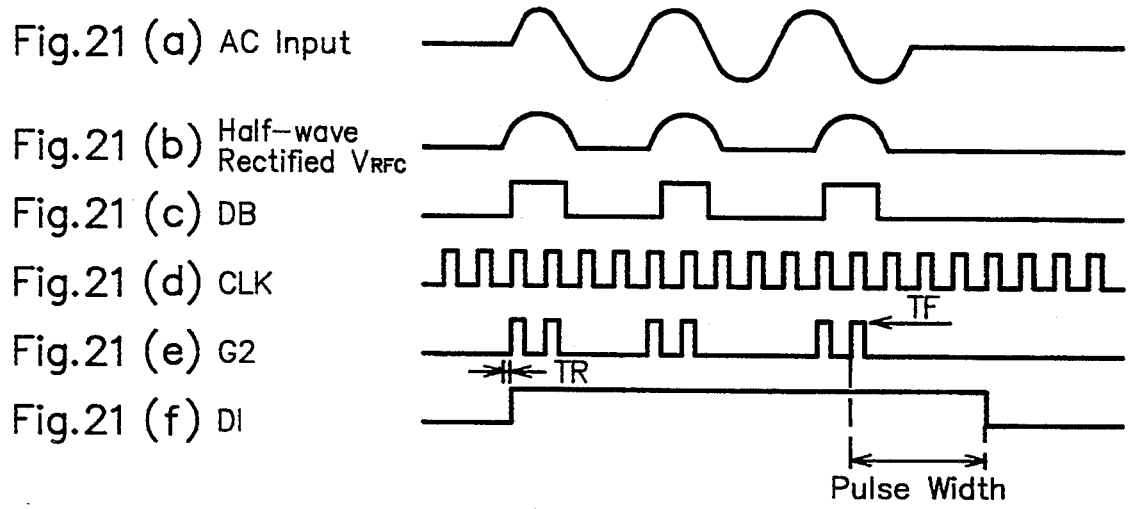
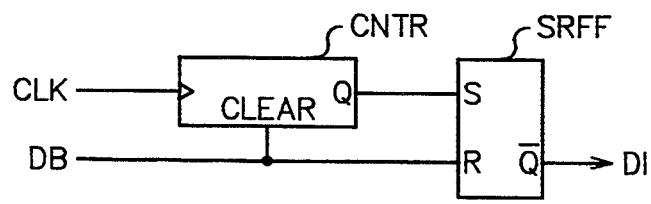
Fig.22
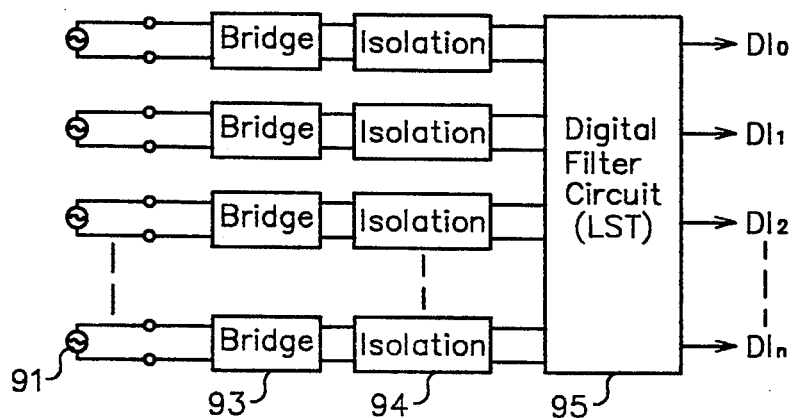
Fig.23

DISTRIBUTED CONTROL SYSTEM HAVING A CONTROL UNIT TO DETECT AND CONTROL INTERRUPTION OF TRANSMISSION TO AND FROM REMOTE INPUT/OUTPUT DEVICES

BACKGROUND OF THE INVENTION

1. Field of the Invention

This invention relates to a distributed control system which controls process variables, such as, for example, temperature, pressure, etc. More particularly, the invention relates to such system comprising a control station which controls various operations, and a plurality of remote input/output devices which are distributed separately from the control station to exchange signals with sensors, actuators, etc. More specifically, the invention relates to transmission control of a data bus which connects the control station to the remote input/output devices.

Furthermore, the invention relates to measures which are undertaken to cope with power failure in such a distributed control system where a plurality of independent power supplies are provided.

2. Description of the Prior Art

A typical distributed control system is supplied with a large number of input signals from a process as a controlled system and outputs manipulated variable signals to a large number of control elements. In order to allow the entire controlled system to be monitored and controlled comprehensively, a plurality of remote input/output devices are connected to the control station in accordance with the nature of each particular task assigned thereto.

Between the control station and the remote input/output devices there is provided a shared memory to which read/write access can be made from both the control station side and the remote input/output device side, and cyclic scan transmission is carried out for each remote input/output device through a remote input/output bus so that the contents of a data buffer used by a microprocessor in the control station and input/output data on the remote input/output device side are maintained equivalently.

Such cyclic scan transmission is carried out according to preset transmission conditions, for example, as follows.

(a) The correspondence between the input/output nodes of the remote input/output devices and the respective addresses on the shared memory.

(b) The cyclic scan transmission cycle used for each input/output node.

(c) The type of transmission service which is to be performed for each input/output node, such as, reading of input data, exchange of output data for read-back data, etc.

A typical conventional system of the type just described is arranged such that when a power supply for the system fails, and then recovers from the failure, the microprocessor in the control station will again execute the above described cyclic scan transmission.

As can be readily understood, the convention system has many problems and deficiencies, and leaves room for improvement. For example, the convention system suffers from the problem that when the power supply recovers from a power failure, the normal transmission control, which is carried out by using the remote input/output bus, cannot be started promptly because the microprocessor in the control station has been engaged in various functions to recover from the power failure and a large amount of time is required for the system to recover to a normal process control operation.

SUMMARY OF THE INVENTION

An object of the invention is to overcome the aforementioned and other deficiencies and defects of the prior art.

Another object is to provide a distributed control system which is capable of promptly recovering its normal process control operation while the power supply recovers from a power failure.

A further object is to provide a distributed control system which is designed so that a remote input/output devices can be disposed at a distance from the control station, without the necessity of providing a field wiring, which connects with sensors or the like, into the control station.

BRIEF DESCRIPTION OF THE DRAWINGS

FIGS. 7(a)–7(d) are timing charts depicting scan communication operation between a control station and a remote input/output device.

FIG. 8 is an illustrative communication frame or packet sent to a control station through a bus.

FIG. 13 is a circuit diagram depicting an exemplary input circuit for inputting a DC voltage signal, an ON/OFF signal of a switching element, and an AC voltage in a remote input/output device.

FIGS. 14(a)–14(d) are timing charts depicting an exemplary operation of the input circuit of FIG. 13.

FIG. 15 is a block diagram depicting an exemplary digital filter circuit of the arrangement of FIG. 13.

FIGS. 16(a)-16(f) are timing charts depicting operation of the digital filter circuit of FIG. 15.

FIG. 17 is a block diagram depicting another exemplary digital filter circuit of the arrangement of FIG. 13.

FIGS. 18 (a)-18(e) are timing charts depicting operation of the digital filter circuit of FIG. 17 using full wave rectification.

FIG. 19 is a circuit diagram depicting another arrangement of a gate circuit used in the circuits of FIGS. 15 and 17.

FIG. 20 is a block diagram depicting an exemplary digital filter used when the rectifier circuit of FIG. 13 uses half-wave rectification.

FIGS. 21(a)-21(f) are timing charts depicting operation of the digital filter of FIG. 20.

FIG. 22 is a block diagram depicting another exemplary digital filter used in the rectifier circuit of FIG. 13 when it is a half wave rectifier.

FIG. 23 is a conceptual view depicting a voltage signal input circuit which is used when a plurality of voltage signals are inputted.

DESCRIPTION OF THE PREFERRED EMBODIMENTS

Figure 1:
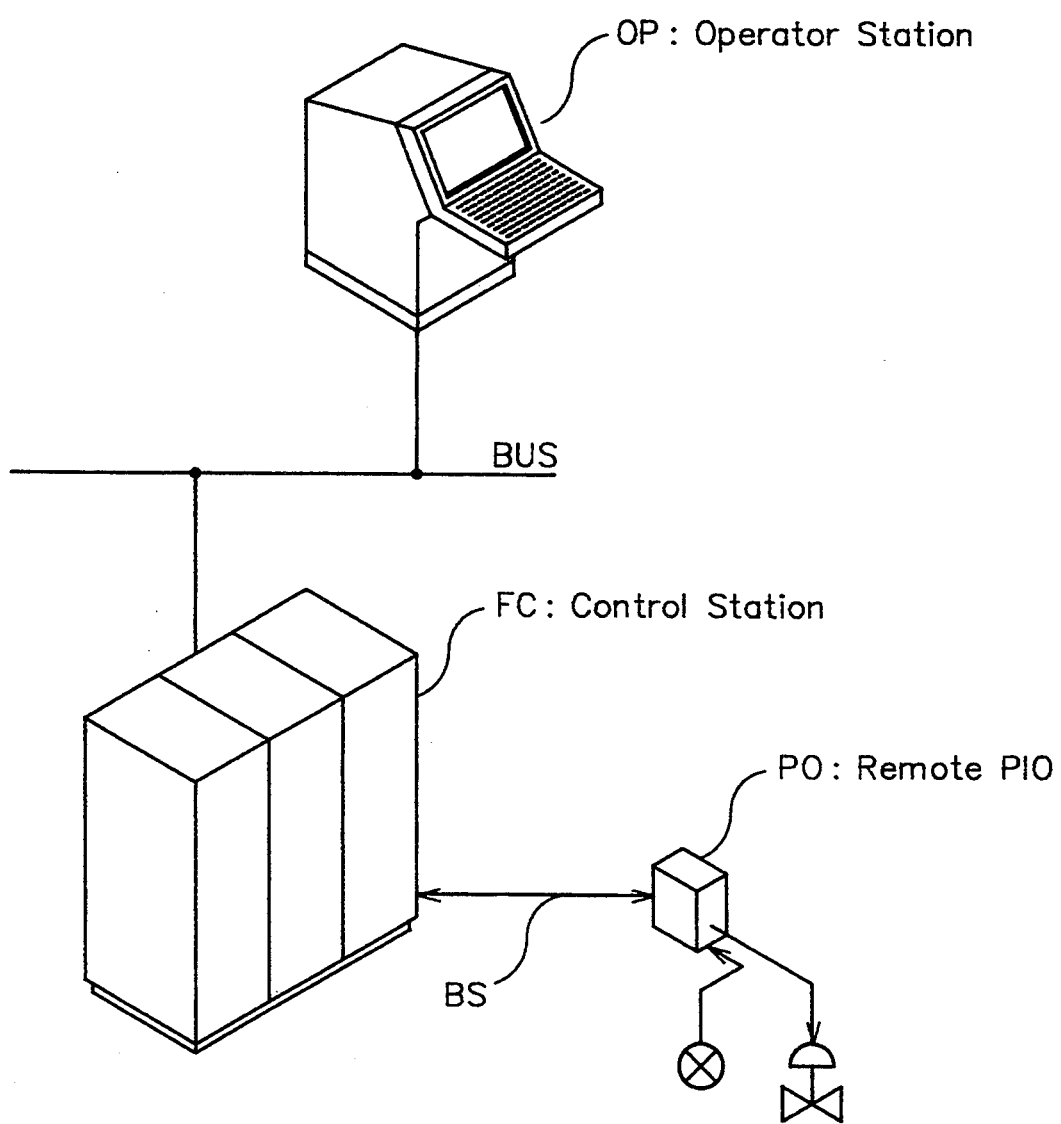
FIG. 1 is a conceptual view depicting an illustrative distributed control system of the invention.

FIG. 1 depicts conceptually a distributed control system of the invention, comprising a plurality of control stations FC which take charge of control operations of a process as a controlled system. The number of control stations FC, distributed over the controlled field, depends on the scale of the process. A remote input/output device PO is provided for each control station FC. The remote input/output device PO is supplied with normalized analog signals, contact signals or various digital signals from various sensors or other similar devices disposed in the process field, and sends a control output signal, such as a manipulated variable signal, to a control element, such as a valve. The control station FC and the remote input/output device PO are connected by a bus BS, and fixed cycle communication, i.e. scan communication, of input/output data is performed therebetween.

An operator station OP functions as a man machine interface and comprises a keyboard and a CRT. The operator station OP is installed in an instrument panel room, for example. The operator station OP is arranged to be capable of displaying process data transmitted from each control station FC through a communication network bus BUS, to instruct the control station FC to change set values, control parameters, etc, and to control process operations.

Between control station FC and remote input/output device PO, scan communication of input/output data is constantly performed through bus BS, so that the state of data which is handled by the remote input/output device PO is reflected on a memory incorporated in control station FC.

Figure 2:
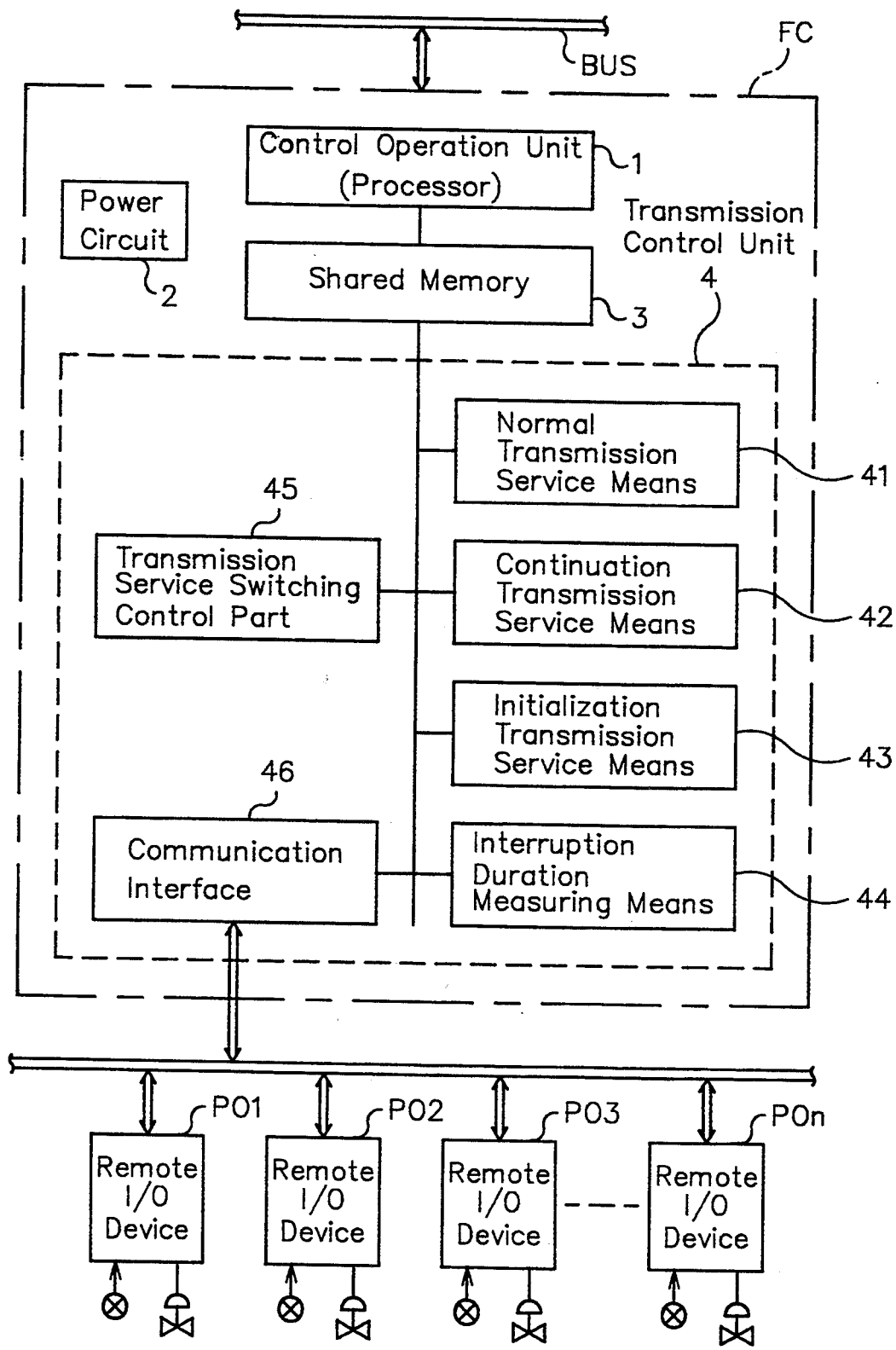
FIG. 2 is a block diagram depicting an illustrative embodiment of the invention.

FIG. 2 depicts an illustrative embodiment comprising a control station FC, which controls operation of the system, and is connected to a plurality of remote input/output devices PO1 . . . POn, through a remote input/output bus BS. The remote input/output devices are distributed over the control field separately from the control station FC and are arranged to be supplied with input signals from various sensors installed in the field and to output control signals to actuators, such as valves.

In the control station FC, a control operation unit, e.g. a processor, 1 controls operation of the system, such as control operation, and sequence control operation. A power circuit 2 supplies electric power to each part of the system FC. (Note that for clarity of description no wiring is shown connected to the power source 2, but, it is to be understood that such appropriate interconnections are present to the various system components) A non-volatile shared memory 3 is arranged so that control operation unit 1 can read/write access the shared memory 3 and so that input/output data, which are transmitted to and from the remote input/output devices through bus BS, can be written cyclically into memory 3 in a cycle with which oversampling is made with respect to the operation cycle of the control operation processor 1.

A transmission control unit 4 controls transmission through remote input/out bus BS. In unit 4, a normal transmission service means 41 performs cyclic scan transmission so that input/output data handled by control operation unit 1 and input/output data on the remote input/output device side of the system are maintained equivalently during data transmission carried out by using remote input/output bus BS in a normal control operating state. A continuation transmission service means 42 first performs transmission of urgent output only, and then performs normal cyclic scan transmission service after completion of transmission of the urgent data. An initialization start transmission service means 43 first performs only cyclic scan transmission to fetch input data. Every one of the foregoing service means may comprise a microprocessor (not shown) provided in transmission control unit 4.

An interruption duration measuring means 44 measures the period of transmission interruption of the remote input/output bus BS. The interruption duration measuring means 44 comprises a timer which is backed up with a battery so that even if the power supply from power circuit 2 fails, the operation of the interruption duration measuring means 44 will continue. A transmission service switching control part 45 performs switching control such that when the result of measurement, made by the means 44, is shorter than a predetermined time, it activates continuation transmission service means 42. On the other hand, when the result of measurement by means 44 is longer than the predetermined time, the transmission service switching control part 45 activates the initialization start transmission service means 43. A communication interface 46 is arranged to send output data remote input/output bus after changing the output data normally to bit serial signals and formatting such signals in a predetermined manner, and to receive such signals.

The operation of the control system described above is as follows.

Operation in the normal control operating state.

Normal transmission service means 41, disposed in control unit 4, performs cyclic scan transmission so that input/output data handled by control operation unit 1 and input/output data on the remote input/output device side of the system are maintained equivalently. The cyclic scan transmission is carried out in a cycle with which oversampling is done with respect to the control operation cycle of control operation processor 1. Input/output data from remote input/output devices PO1 . . . POn are written into shared memory 3, and the contents of memory 3 are updated.

Control operation unit 1 reads out the input/output data from shared memory 3 in the control operation cycle and performs predetermined control operation by using the readout data. For example, control operation unit 1 performs PID control operation on the deviation of a measured value (PV), which is obtained from the process, from a preset value (SV) for control, to obtain a control output (MY). Then, control operation unit 1 writes the results of the operation into shared memory 3. The output data, written into shared memory 3 by control operation unit 1, is sent to remote input/output devices PO1, . . . POn to control the operation of actuators linked thereto.

The above described control function results in control of the opening of a valve, for example, based on the arithmetic operation by control unit 1.

The correspondence between the remote input/output devices and the respective shared memory address positions, and the type of transmission service performed are previously set for each remote input/output device prior to start of the operation of the system.

Operation when a momentary transmission interruption occurs

The interruption duration measuring means 44 monitors the transmission condition on the remote input/output bus BS for each input/output device, and when the period of transmission interruption is shorter than a predetermined period of time, the means 44 judges that a momentary transmission interruption has occurred. In this case, the transmission service switching control part 45 drives the continuation transmission service means 42. The continuation transmission service means 42 first performs transmission for urgent output, and after completion of the urgent output transmission, it shifts the transmission mode to the normal cyclic scan transmission. It should be noted here that to which output node the urgent output transmission is to be performed is set in advance, together with other transmission conditions, for example, a limit to the number of times of retransmission, which is carried out when a transmission error occurs during the urgent output transmission.

Operation when long transmission interruption period occurs

When interruption duration measuring means 44, which monitors the transmission condition of the remote input/output bus BS for each of the remote Input/output (I/O) device, judges that the period of transmission interruption is longer than a predetermined period of time, transmission service switching control part 45 activates initialization start transmission service means 43. The means 43 first performs only the cyclic scan transmission for inputting data, including read back of the output value to the actuator, thereby updating the input data. After completion of transmission, which is limited to the data input operation, control operation unit 1 updates the output data as a result of the arithmetic operation and then shifts the transmission service to the normal transmission service.

In this manner, part 45 carries out control of the operations of each of the transmission service means, depending on the period of transmission interruption, for each I/O device.

Figure 3:
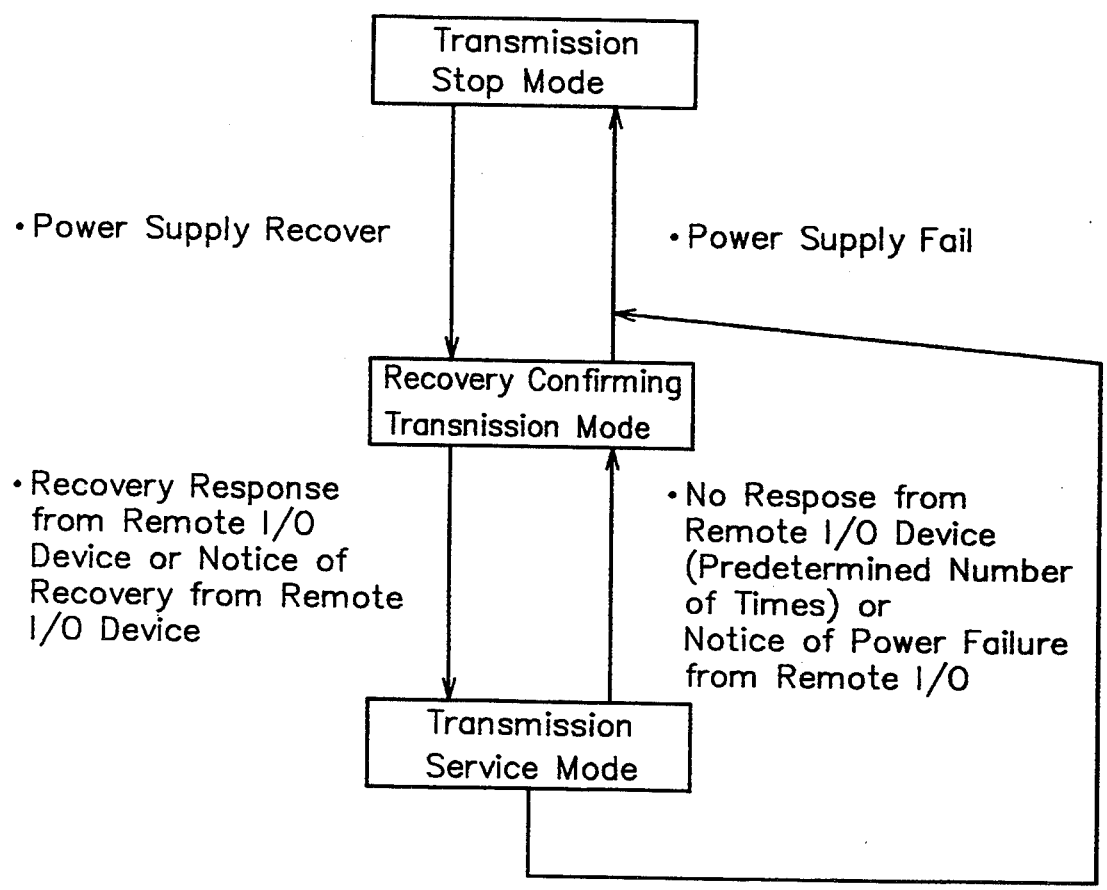
FIG. 3 is a chart depicting basic operating modes prepared for each of the normal, continuation and initialization start transmission services means.

FIG. 3 illustrates basic operating modes prepared for each of the normal, continuation and initialization start, transmission service means 41,42, and 43.

Each transmission service means performs the above described transmission service, depending on the period of transmission interruption and has the following operating modes.

Transmission stop mode

The transmission service means enters this mode when a power failure occurs in control operation unit 1 in a state where no data is being transmitted between unit 1 and any of the remote I/O devices.

Recovery confirming transmission mode

During this mode, no transmission, i.e. I/O transmission, for any application is carried out, but it is checked to see whether or not frame transmission can be performed between unit 1 and each I/O device.

When unit 1 recovers from the power failure, the operating mode is shifted from the transmission stop mode to this mode.

Transmission service mode.

During this mode, transmission, i.e. I/O transmission, for an application is carried out. The operating mode shifts from the recovery confirming transmission mode to this mode, when recovery response or notice of recovery is received from the remote I/O device side of the system.

When no response from the I/O device side of the system is received consecutively more than a predetermined number of times, or when a power failure notice signal is outputted from the remote I/O devices side of the system, the operating mode is shifted from this mode to the recovery confirmation transmission mode.

It should be noted that the interruption duration measuring means 44, which may be a timer, operates in such a manner as to start measuring time at the point in time when the operating mode shifts from the transmission service mode to the recovery confirming transmission mode, and to stop the measuring at the point in time when the recovery process in the recovery confirming transmission mode is completed, thereby determining the time interval between the two points as being the period of transmission interruption.

In the above arrangement, when the power supply recovers from a power failure, the most appropriate transmission service means is activated, depending on the period of interruption, so that the system can rapidly recover from the transition interruption state and shift promptly to the normal process control operation.

Figure 4:
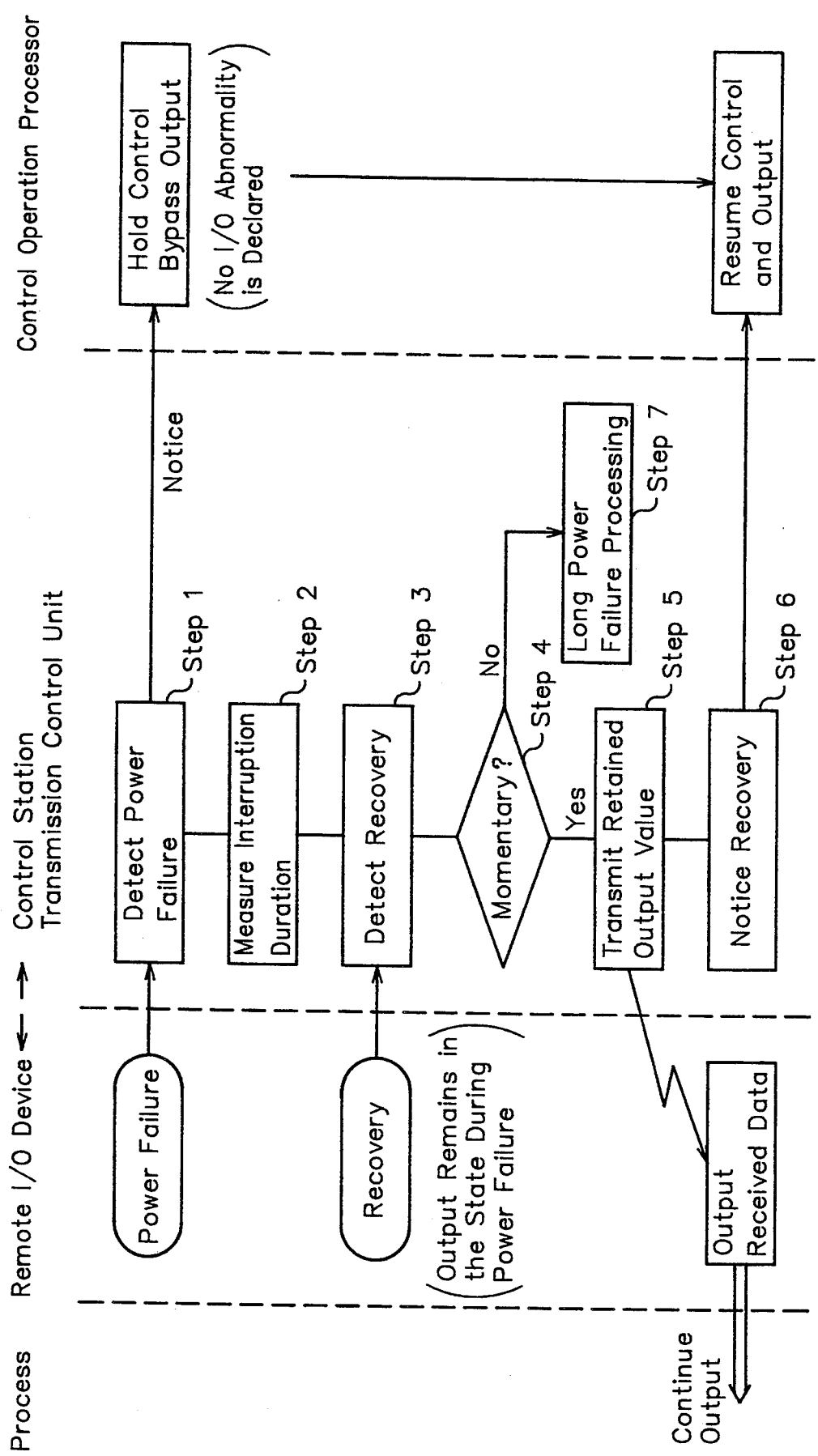
FIG. 4 is a flow chart depicting an operation which takes place when a momentary power failure occurs on the remote input/output device side of the system.

FIG. 4 is a flow chart showing operation when a momentary power failure occurs on the remote I/O device side of the system. Control station FC is provided with an output data holding means which always holds the latest output data that is delivered to the remote I/O device side of the system. When a power failure occurs on the remote I/O device side of the system, interruption duration measuring means 44 detects the failure via remote I/O bus BS (step 1) and measures the period of interruption (step 2).

It can be mentioned that power failure on the remote I/O device side of the system and recovery from such failure may be detected by receiving a notice signal representative of such failure, and a recovery notice signal representative of such recovery, which are sent from the remote I/O device side of the system. It is also possible to detect the occurrence of a power failure and the recovery therefrom from an interruption of data transmission, which is carried out cyclically by using the bus When the power supply on the remote I/O device side of the system recovers from the failure, interruption duration measuring means 44 detects the recovery and suspends measurement of the period of interruption (step 3).

Transmission service switching control part 45 decides whether the power failure is momentary or not by judging whether the interruption duration measured by means 44 is shorter or longer than the predetermined time period (step 4). If the failure is judged to be a momentary power failure, part 45 activates means 42, so that after the power supply has recovered from the failure, the output data delivered just before the occurrence of power failure, is first transmitted to the remote I/O device side of the system (step 5).

On receipt of the output data from the control station FC side of the system, the remote I/O device (PO) side of the system, sends the control data to the process side. Thus, the control output is continuously sent to the process side. Upon completion of of the continuation start operation, after the momentary power failure, the operation shifts to the cyclic scan transmission, which is performed by normal transmission service means 41.

In addition, notice of recovery is sent to the control operation unit 1 (step 6), so that the control operation and the sending of the control output are resumed.

It is noted that when a transmission error occurs during the transmission of the output data during continuation startup, the transmission of the output data is repeated until the data is successfully transmitted, within a preset number of times. Such number of times of retransmission of output data and other transmission conditions are set in advance.

At step 4, if it is judged that a long power failure occured on the remote I/O device side of the system, part 45 activates initialization start transmission service means 43 to execute processing for a long duration power failure (step 7).

The processing for a long duration power failure is realized, for example, by executing the cyclic scan transmission for fetching the input data, including read back of an output value to an actuator, and then updating the input data on the basis of the cyclic scan transmission. On completion of the transmission for initialization start, which is limited to fetching of the input data, the operation shifts to the normal cyclic scan transmission, which is performed by means 41.

Figure 5:
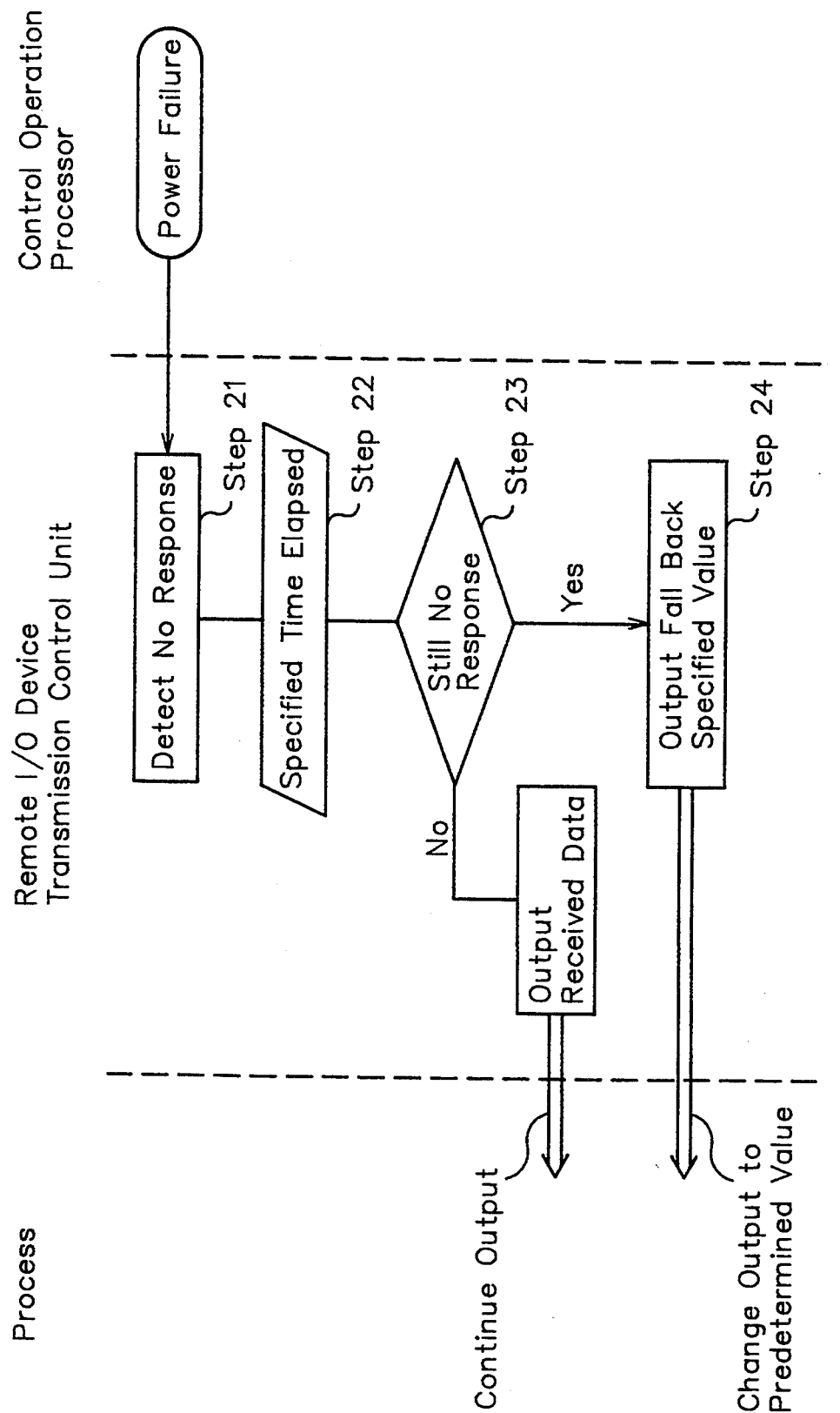
FIG. 5 is a flow chart depicting an operation which takes place when a power failure occurs on the control station side of the system.

FIG. 5 is a flow chart showing operation when power failure occurs on the control station side (FC) of the system. When power failure occurs on the control station side, or there is an abnormality in the operation of the station FC, or a failure in the remote I/O bus BS, no data transmission is carried out through the remote I/O bus BS, and a time up signal is sent from a watch dog timer, for example, which is provided in control station FC. In the remote I/O device side of the system, there is provided one or more no-response detecting means that judges whether there is an abnormality on the control station side of the system by detecing no response to the data transmission through the remote I/O bus BS or detecting a time up signal from the control station side of the system.

When the no-response detecting means detects a no-response state (i.e. an abnormal state) (step 21), and when the no-response state continues for a long period of time (steps 22,23), a signal representataive of a specified safe value (i.e. a default value) is sent to the process side (step 24).

When the no-response time is short (e.g. in the case when control station FC recovers immediately from an abnormal state), data which is received from the control station side of the system is sent to the process side of the system to continue the data output operation.

With the above operation, when a momentary power failure occurs on the remote I/O side of the system, or on the control station side of the system, the control operation is continued without suspending the control function. In addition, when there is a malfunction in the control station FC or a trouble in the I/O bus BS, the output value of the process is changed to a safe value without causing runway of the system.

Figure 6:
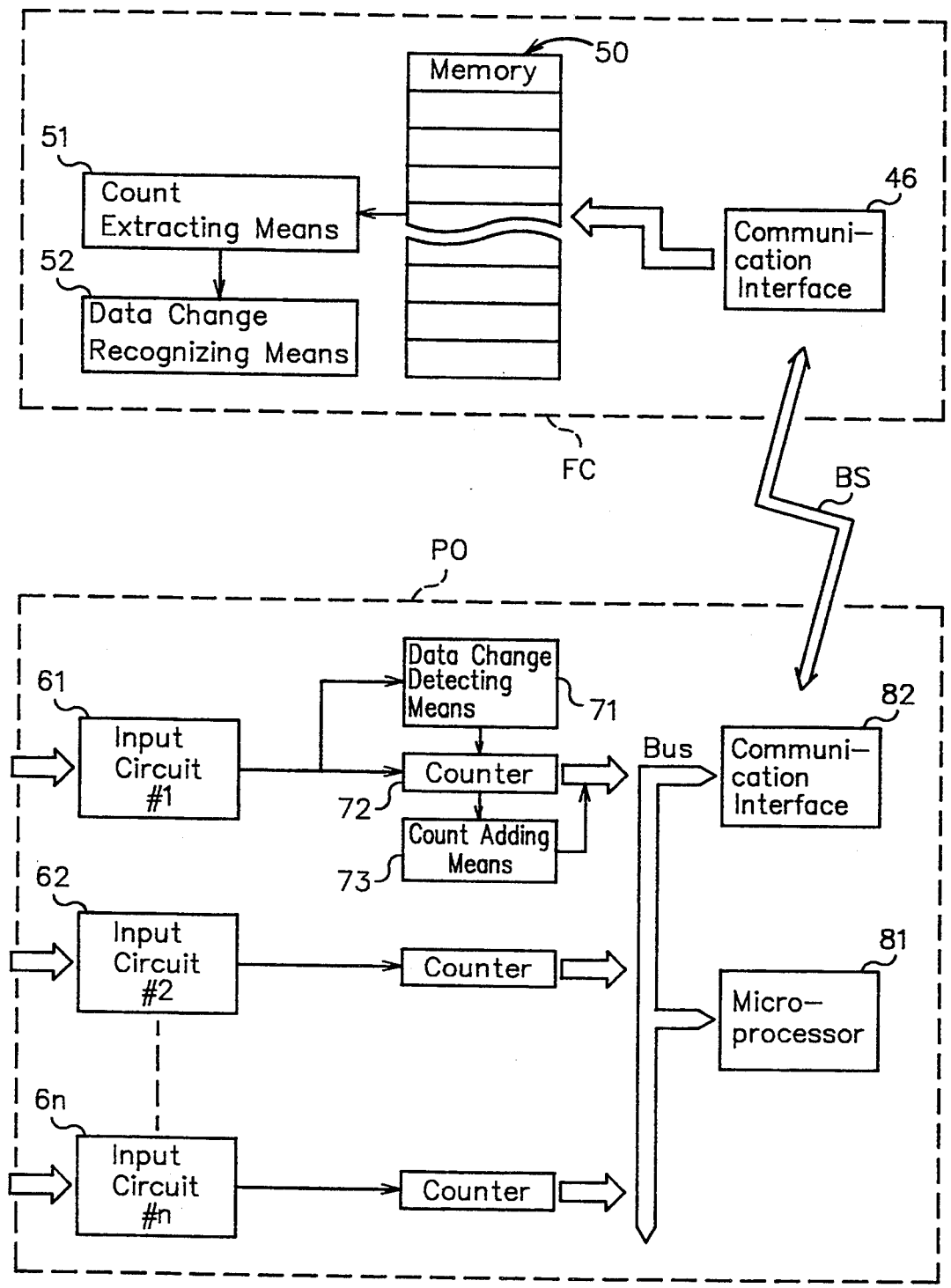
FIG. 6 is a block diagram depicting a data transfer function, which is used in each of the transmission service means, with the figure mainly showing a function used to transfer data from the remote input/out device side of the system.

FIG. 6 is a block diagram depicting data transfer in each of transmission service means 41,42, and 43, with the figure mainly showing such function used to transfer data from the remote I/O device side of the system.

In the remote I/O device PO, which serves as a data sending station, input circuits 61,62 . . . , are provided to correspond to contact input signals, respectively, so as to process input contact signals into signals which can be handled by the remote I/O device PO by electrically isolating the contact signals and by removing noise therefrom.

A data change detecting means 71 detects whether or not there is a change in the data which is to be sent from the remote I/O device PO. A counter 72 is activated to count up or down when the data means 71 detects a change in the data. A count adding means 73 adds the value of the counter 72 to the signal which is to be sent from the remote I/O device PO. These means are provided for each input signal. A communication interface 82 performs data transmission between the remote I/O device PO and the control station FC. A microprocessor 81 is connected to the communication interface 82 through bus BS. Each of the data change detecting means 71, counter 72, and count adding means 73, are realized for example by use of appropriate software.

In control station FC, which serves as a data receiving station a communication interface 46 is connected to bus BS. Interface 46 receives signals from remote I/O device PO and stores them sequentially in a scan input image region of a memory 50, as scan input images. A count extracting means 51 extracts from the scan input images a counter value sent by the present scan communication and a counter value sent by the preceding scan communication. A data change recognizing means 52 compares the present and preceding counter values which are extracted by means 51, and recognizes a change in data when there is a difference between the two counter values.

FIGS. 7(a)-7(d) are timing charts showing scan communication between control station FC and remote I/O devices PO, wherein FIG. 7(d) shows the control cycles and FIG. 7(a) shows ON/OFF signals which are inputted to remote I/O device PO from a pushbutton operated means, for example. Data change detecting means 71 detects whether or not there is change in the input signal, shown in FIG. 7(a), for example, from OFF to ON. When a signal change occurs, means 71 causes counter 72 to count up, for example, as shown in FIG. 7(b). In this example, it is assumed that the initial value of counter 72 is "1" and counter 72 counts up consecutively from the initial value for simplification. It should be noted that the value of counter 72 returns to the initial value when it reaches the counter capacity. Means 73 reads the value of counter 72 in scan cycle T2 and adds the counter value to a communication frame, or communication packet (see FIG. 7(c)). The communication frame with the counter value added thereto is transmitted to control station FC through the communication interface 82.

FIG. 8 shows one example of the arrangement of a signal communication frame or packet sent to control station FC through bus BS. The frame, or packet, comprises an address ADR of a remote I/O device PO, which is provided at the top, a channel number CHN of an input contact signal, which follows the address ADR, a counter value COU added as data, which follows the channel number CHN, and a parity PY provided at the end.

At control station FC, as depicted in FIG. 6, interface 46 writes sequentially signals sent thereto in scan communication cycle T2 in a region of memory 50 which constitutes a scan input image buffer, as shown in FIG. 7(c). The write cycle, or input cycle, corresponds to the scan communication cycle T2. If a communication error occurs during the scan communication, as shown by X, between FIGS. 7(b) and 7(c), control station FC does not up date the scan input image. Where there are a plurality of input changes during one period of the scan communication cycle T2, as in the case of a part that is represented by counter values "3,4, and 5" in FIG. 7(b), the scan input image does not change consecutively, but a plurality of count up operations are performed at a time (that is the value is counted up from "3" to "5" directly) as shown at the corresponding parts in FIG. 7(c).

The scan input image, which is stored in the scan input image buffer, can be read according to need in control station FC. In the case shown in FIG. 7(d), the scan input image is read out in control cycle T1 of control station FC. The reading of the scan input image is carried in the following manner.

Count extracting means extracts from the scan input image buffer a counter value sent in the present scan communication and a counter value sent in the preceding scan communication. Next, data change recognizing means 52 compares the present and preceding counter values which are extracted by means 51. If there is a difference in counter values, means 52 recognizes that there is a change in input contact signals. On the other hand, if there is no difference between the counter values, means 52 recognizes that there is no change in input contact signal. Then, means 52 transfers the result of the recognition to a CPU or the like in control station FC.

If means are provided for obtaining incremental data representative of an amount by which the present counter has increased from the preceding counter value, it is possible to recognize the number of changes which have occurred since the preceding communication cycle.

Although the above description is of an input contact signal which is transferred from a remote I/O device PO to control station FC, the invention may be applied to where data is used to control the ON/OFF state of a valve, for example, by transfer of data from control station FC to a remote I/O device PO. Furthermore, the frame or packet arrangement need not be limited to that shown in FIG. 8. Also, the counting can be down as well as up. The term "counter" includes means, such as a register means, wherein data value stored therein may change in accordance with input signals.

By executing the above scan communication to transfer data between a control station FC and a remote I/O device, a signal change can be transmitted reliably without omission or overlap even if there is a communication error or a signal change which is more rapid than the scan communication cycle.

Figure 9:
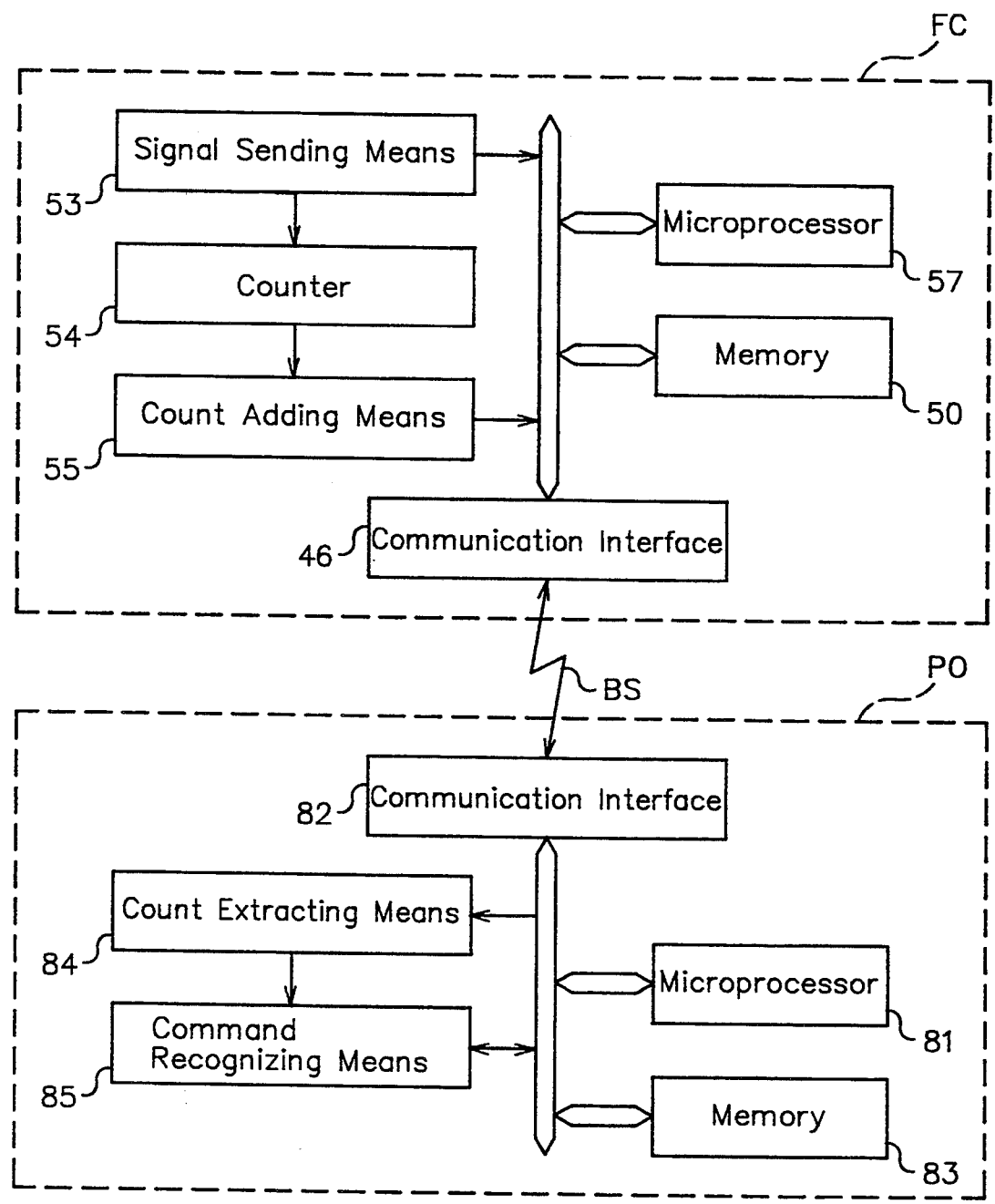
FIG. 9 is a block diagram depicting a data transfer function, which is used in the normal transmission service means, with the figure mainly showing a function used to transfer data from the control station side to the remote input/output device side of the system.

FIG. 9 shows data transfer function in normal transmission service means 41 with FIG. 9 mainly showing data transfer from control station FC to remote I/O device PO. It is assumed that signals, such as those which are represented by "A", "B", "C" . . . are transferred as processing commands from control station FC to remote I/O device PO.

In station FC, a signal sending means 53 sends commands for processing to be executed in remote I/O device PO and also sends other necessary and/or desired signals. A counter 54 is activated to count up or down when one processing command sent from means 53 is changed to another processing command. A counting means 55 adds the value of counter 54 to the processing command which is to be sent from station FC. A microprocessor 57 realizes, for example, signal sending means 53, counter 54, and count adding means 55, by use of appropriate software.

In remote I/O device PO, a communication interface 82 receives a signal sent from station FC. The received signal is stored in memory 83. A count extracting means 84 extracts a counter value sent by the present scan communication and a counter value sent by the preceding scan communication. A command recognizing means 85 compares the present and preceding counter values. When these two counter values are the same, means 85 continuously executes the operation based on the present processing command. When the two counter values are different from each other, the means 85 judges that a new processing command has been sent, and commences processing based on the new processing command. A microprocessor 81 realizes, for example, count extracting means 84 and command recognizing means 85 by use of appropriate software.

Figure 10:
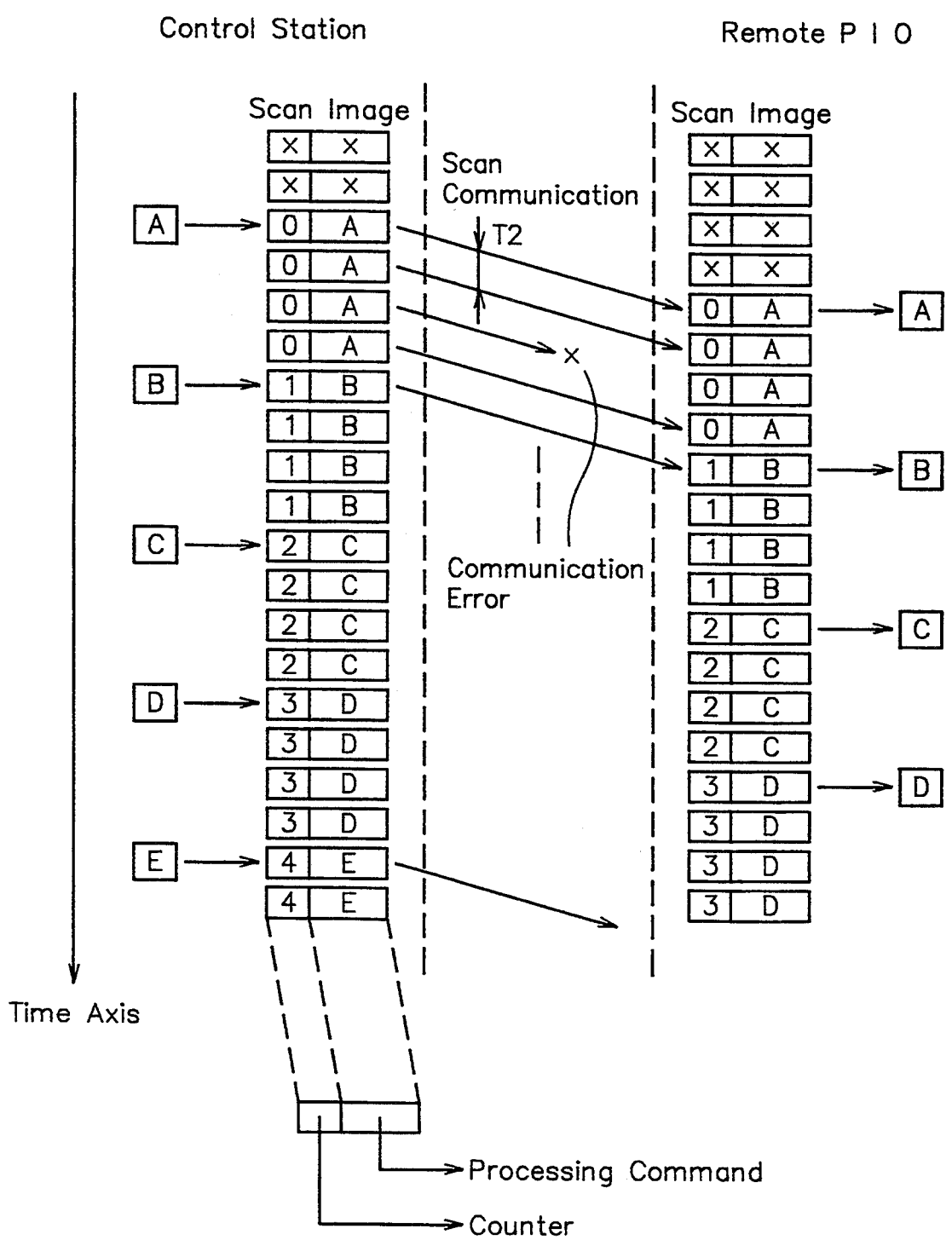
FIG. 10 is a timing chart depicting scan communication carried out from a control station to a remote input/output device.

FIG. 10 is a time chart showing scan communication between station FC and remote I/O device PO, such as shown in FIG. 9, wherein the time axis extends from the top of the drawing to the bottom thereof. When station FC demands that remote I/O device PO execute processing "A", a processing command "A" for starting the processing concerned is sent from signal sending means 53. Counter 54 is not activated to count up, for example, but is maintained in a "0" state until the next processing command "B" is executed. Count adding means 55 adds the counter value "0" at this time to the processing command "A" and sends the combined signal to the remote I/O device PO. The same communication frame, which comprises the counter value and the processing command, is continuously sent for each scan cycle T2. Thus, scan input images are formed in memory 83 provided in remote I/O device PO.

If a communication error occurs during the scan communication, as shown by X between station FC and I/O device PO in FIG. 10, updating the scan image is not executed. In this example, it is assumed that the initial value of counter 54 is "0" and counter 54 counts up consecutively from the initial value, for simplicity.

The value of counter 54 returns to the initial value when it reaches the capacity of the counter.

To allow remote I/O device PO to execute the next processing command "B", station FC changes the processing command to "B", then activates counter 54 to count up by one, and then sends a communication frame (also called "combined signal" in the above discussion) comprising counter value "1" and processing command "B" to remote I/O device PO. Thereafter, station FC successively changes the processing command and, at the same time, counts up the counter value, and then sends the resulting communication frame to remote I/O device PO, in the same manner as discussed above.

In remote I/O device PO, count extracting means 84 extracts the counter values sent through bus BS in the scan communication cycle, and command recognizing means 85 takes the extracted counter values and compares the present and preceding counter values. If these two are the same, means 85 maintains the present processing. If they are different, e.g. when the counter value has been counted up from "0" to "1", means 85 judges that a new processing command has been sent, and starts processing according to command "B".

Thus, remote I/O device PO can start various types of processing according to the command signal sent from station FC on the basis of the judgment made by means 85.

In the above discussion of the foregoing embodiment, it is noted that processing which is activated in remote I/O device PO, includes sending of a manipulated variable signal to a valve or the like installed in the process field, and processing of the start of various types of programs used in the remote I/O device PO. In addition, although the description is in terms of counting up, the counting can also be downward. Also, the term "counter" may include a register means wherein a digital signal disposed therein may change in accordance with input signals applied thereto.

Advantageously, the remote I/O device PO can be activated reliably to execute various processing steps by transmitting commands thereto independently of any communication error or omission of information, if such should occur.

Figure 11:
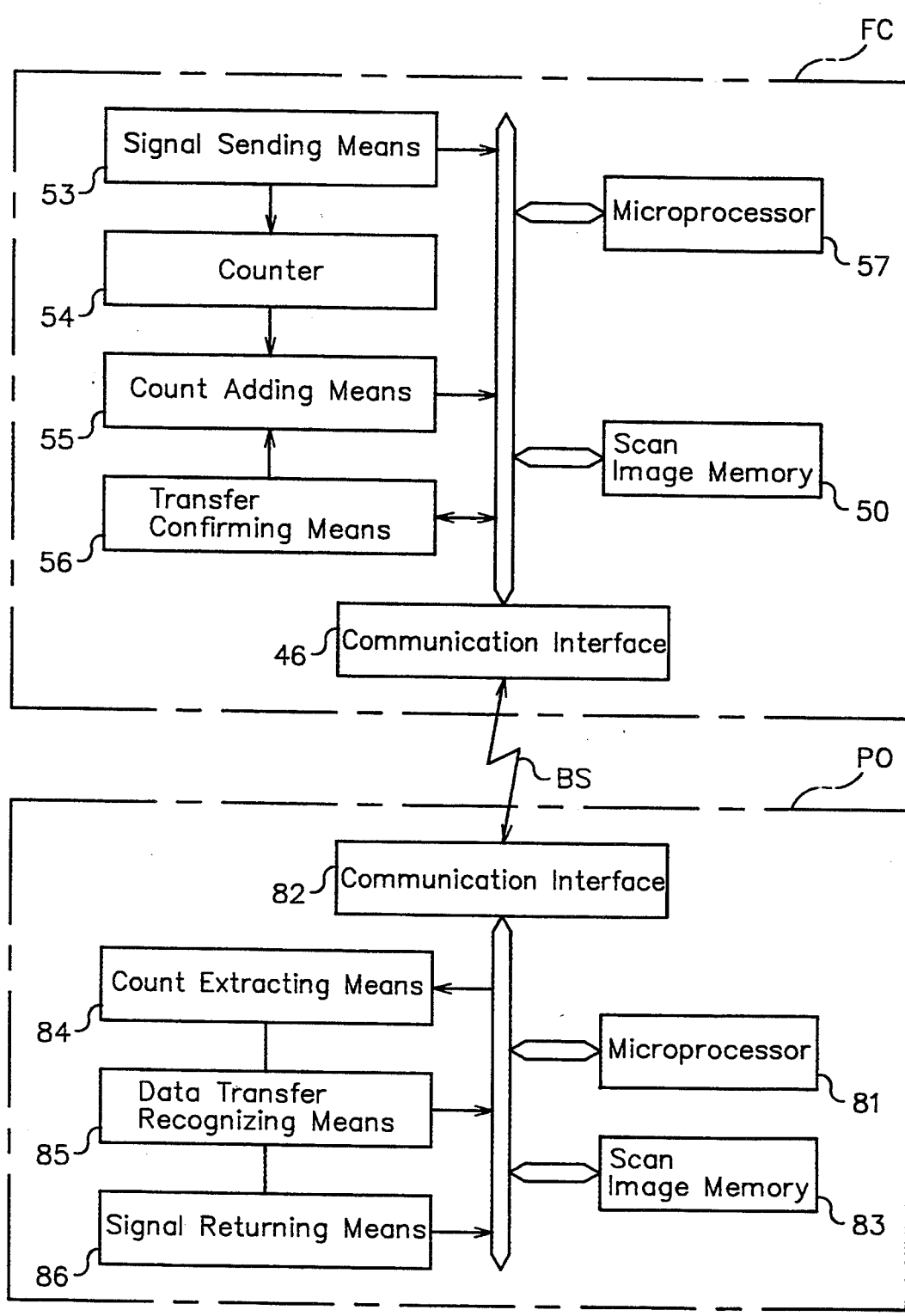
FIG. 11 is a block diagram depicting a data transfer function, which is used in each of the transmission service means with the figure mainly showing a function which is used to effect reliable data transmission between the control station and a remote input/outut device with hand shaking executed therebetween.

FIG. 11 shows data transfer function used in each of the transmission service means 41,42 and 43, with the figure mainly showing transfer between control station FC and remote I/O device PO with handshake being executed therebetween. The arrangement assumes that station FC is a data transmitting station, and remote I/O device PO is a data receiving station. Accordingly, when bidirectional data transfer is carried out, each device must be provided with both sending and receiving functions.

In station FC, a transfer confirming means 56 compares (a) a combination of data and counter value, which has been sent back from remote I/O device PO, and (b) a combination of data and counter value which is being sent out, so as to determine whether or not data transfer has been effected. If a match is found between the two, means 56 judges that the data transfer has been effected, and instructs the system to send new data, together with a counter value which has been counted up or down, to the receiving station. If a mismatch is found between the two, means 56 judges that data transfer is not being effected, and instructs signal sending means 53 to continue the sending of data and counter value which are being sent out. Advantageously, a microprocessor 57, for example, realizes signal sending means 53, counter 54, count adding means 55, and transfer confirming means 56 by use of appropriate software.

In remote input/output device PO, a count extracting means 84 extracts a counter value from the received signal. A data or command transfer recognizing means 85 recognizes that data transfer has started when it detects a difference between a counter value received in the present receiving operation and extracted by means 84 and a counter value received in the preceding receiving operation and similarly extracted by means 84. Signal returning means 86 returns, when receiving data and counter value from station FC acting as a data transmitting station, the received data and counter value to station FC by scan communication in a predetermined cycle. Microprocessor 81, for example, realizes count extracting means 84, data transfer recognizing means 85, and signal returning means 86 by use of appropriate software.

Figure 12:
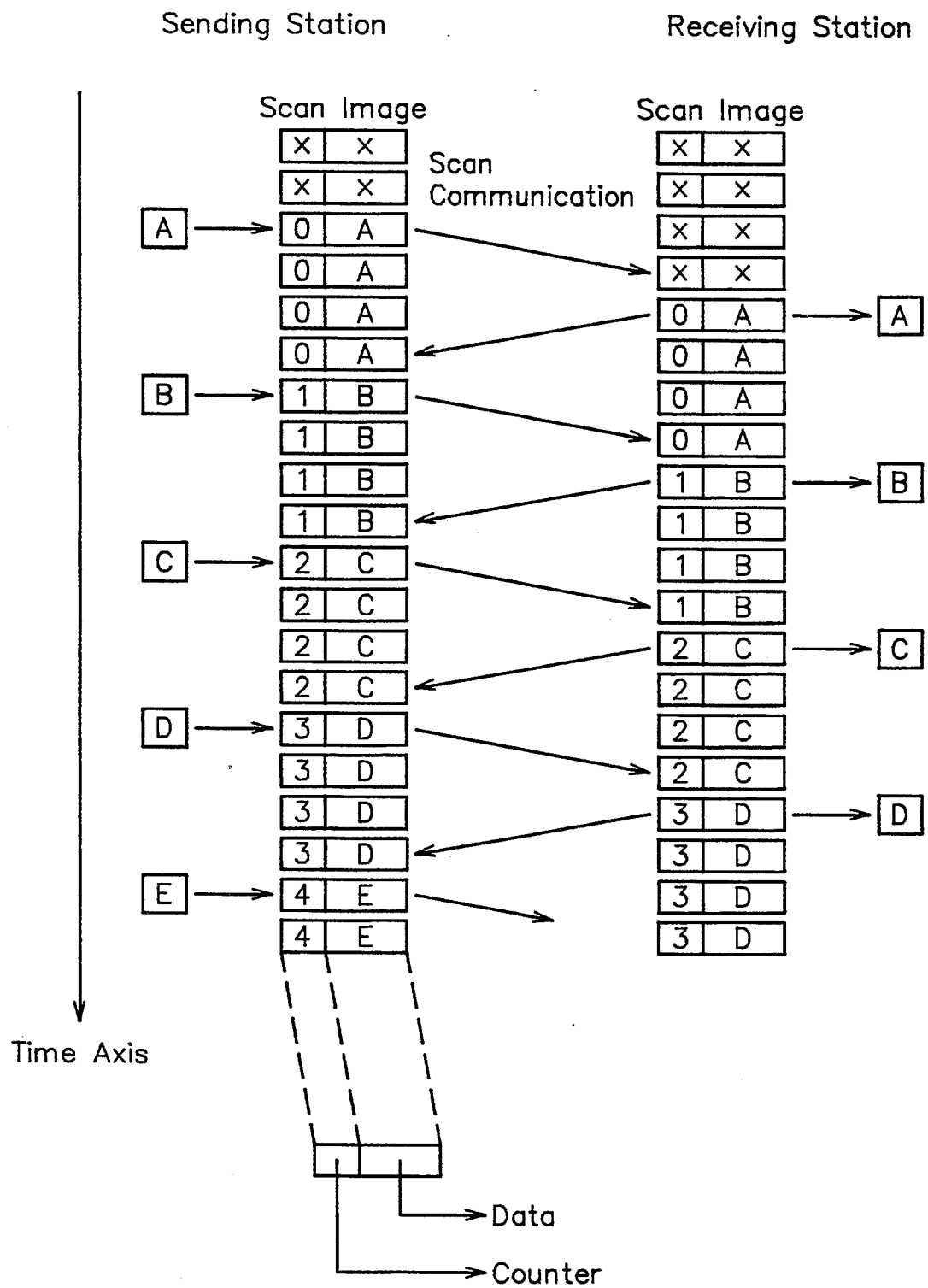
FIG. 12 is a timing chart depicting scan communication between the data control station and a remote input/output device in the arrangement of FIG. 11.

FIG. 12 shows scan communication between control station FC, acting as a data transmitting station, and remote input/out device PO, acting as a data receiving station, as shown in FIG. 11. It is assumed that data "A" to "E" is to be transferred from the sending station to the receiving station.

Upon commencing transfer of data "A" at station FC, signal sending means 53 and count adding means 55 carry out scan communication by adding a new counter value "0" to data "A" to be transferred. In the data transfer, the same communication frame, which comprises data "A" and counter value "0", is repeatedly transmitted for each scan communication cycle until the control process shifts to the next step.

At receiving station PO, count extracting means 84 extracts a counter value from the received signal of the present reception and of the preceding reception, and means 85 compares the two counter values. If there is a difference between the two values, data transfer recognizing means 85 judges that the transfer of new data has started, and stores the sent data "A" into a predetermined region of memory 83 so that microprocessor 81 can use such data. Signal returning means 86, when receiving data, returns the received data "A" and the counter value "0" to the sending station by scan communication in a predetermined cycle. In this operation, the same data and the same counter value are repeatedly sent for each scan communication cycle until the control process shifts to the next step.

At data sending station FC the transfer confirming means 56 receives data "A" and counter value "0", which are sent back from the data receiving station by scan communication, and compares them with the data and counter value being sent out. If the data and counter values match each other, transfer confirming means 56 judges that the data transfer has been correctly carried out, and instructs signal sending means 53 to send new data "B", together with a counter value, which is counted up, for example, "1", to the receiving station. On receipt of such instruction, signal sending means 53 enters a new step where it sends new data "B" and counter value "1" to the receiving station.

On the other hand, if the data and counter value do not match, because of communication failure, e.g. loss of communication frame, transfer confirming means 56 instructs signal sending means 53 to continue the sending of data "A" and counter value "0", which are being currently sent out. In this way, the sending and receiving stations perform reliable transfer of data "A", "B" . . . , while executing handshaking.

Although in the above description, the counter value is counted upward, it may also be counted downward.

By the above scan communication, various kinds of data can be readily transferred to the remote I/O station independently of communication error.

FIG. 13 shows an input circuit for inputting DC voltage signals, an ON/OFF signal of a switching element, and an AC voltage signal in the remote I/O device PO. The circuit comprises an AC power source or supply 91, and a switching element 92, for example, a relay contact, which outputs a status signal in accordance with the controlled condition of the process. It should be noted that when the AC power supply 91 shows an ON/OFF state in accordance with the controlled condition of the process, switching element 92 can be eliminated. A diode bridge rectifier circuit 93 is provided to rectify an input AC voltage signal that is applied via switching element 92 and outputs a unipolar voltage signal $V_{rec}$, which is not smoothed. A signal isolating means 94 is supplied with the unipolar voltage signal $V_{rec}$ through a resistance R1 and driven by this voltage signal. In this embodiment, a photocoupler is used as the signal isolating means 94.

A load resistance RC is show to illustrate the signal isolating means 94, which as above stated can be a photocoupler. A buffer BUF receives the signal which is transmitted through the means 94. A digital filter circuit 95 is supplied with the output from buffer BUF, that is, isolated digital signal DB which is transmitted through signal isolating means 94. The digital filter circuit 95 is arranged to remove short time OFF signals from the signal applied thereto and to output a digital signal DI.

FIGS. 14(a)–14(d) are timing charts showing an exemplary operation of the input circuit of FIG. 13, wherein it is assumed that an AC voltage signal $V_{in}$ is outputted in accordance with the ON/OFF state of switching element 92, as shown in FIG. 14(a).

Diode bridge rectifier circuit 93 subjects the AC supply voltage to full-wave rectification and outputs a unipolar voltage signal $V_{rec}$, as shown in FIG. 14(b). Signal isolating means 94 is driven using the rectified voltage signal so as to output an isolated digital signal DB including short pulse signals P, as shown in FIG. 14(c), from the output end of buffer BUF.

Digital filter circuit 95 removes the short time OFF signal, i.e. short pulse signals, P from the isolated digital signal DB transmitted through signal isolating means 94 and outputs the resulting signal as a digital output signal DI, as shown in FIG. 14(d) The digital output signal DI has delays $T_R$ and $T_F$ at the rise and fall thereof, as shown. However, the delays $T_R$ and $T_F$ are of the order of 40% (2×2×0.1) of the period of the AC power supply at the maximum and can be reduced to values which have substantially no adverse effect in normal operation.

FIG. 15 shows an exemplary digital filter circuit 95 of FIG. 13, comprising three flip-flops, FF1, FF2, FF3, a gate circuit G1 supplied with isolated digital signal DB and the respective outputs Q1 and Q2 from flip-flops FF1 and FF2, and a switch SW1 driven by the output from gate circuit G1 so as to select either of the outputs Q1 and Q2 from flip-flops FF1 and FF2 and to apply selected outputs to flip-flop FF3.

Flip-flops FF1 and FF2 are arranged in the form of shift registers so that either of outputs Q1 and Q2 from flip-flops FF1 and FF2 is selected in accordance with the outputs from gate circuit G1 and latched by the flip-flop FF3. It should be noted that each flip-flop is operated by use of clock signals or pulses CLK.

The circuit realizes, as a digital filter algorithm used in the case of full wave rectification, an operation wherein when the isolated digital signal DB continues longer than a specified time, e.g. 1 clock period, the outut signal DI=DB, and in other cases, DI=no change.

FIGS. 16(a)–16(f) show the timing of the operation of the circuit of FIG. 15, wherein FIG. 16(a) shows the clock signals CLK which are applied to each flip-flop, and FIG. 16(b) shows the isolated digital signal DB. During the interval TR, which is immediately after the rise of isolated digital signal DB, the respective outputs Q1 and Q2 from flip-flops FF1 and FF2 successively rise in response to the rise of the isolated digital signal DB, as shown in FIGS. 16(c) and 16(d), and the output digital signal DI also rises in synchronism with the second clock signals.

When the isolate digital signal DB temporarily becomes "0" halfway, as shown by arrow P, it is reflected on the outputs Q1 and Q2 from flip-flops FF1 and FF2. If the interval during which the isolated digital signal DB temporarily becomes and remains "0" is shorter than one period of the clock signals CLK, the isolated digital signal DB becomes "1" before the output Q2 becomes "0". Thus, the output from gate circuit G1 becomes "1", i.e. a high level, as shown in FIG. 16(e), so that switch SW1 selects output Q2 from flip-flop FF2, and flip-flop FF3 latches same. Accordingly, digital output DI from flip-flop FF3 does not change, but maintain the high level (i.e. "1") state, as shown in FIG. 16(f).

If the isolated digital signal DB becomes and remains "0" for a longer time than one period of the clock pulse CLK, as in the case of interval TF immediately after the isolated digital signal DB has fallen, switch SW1 does not change over, and digital output DI from flip-flop FF3 falls, as shown in FIG. 16(f), when time TF has elapsed from the time of the fall of the isolated digital signal DB (i.e. when one period of the clock pulse CLK has elapsed from the time of the fall of the isolated digital signal DB).

By this operation, even if the isolated digital signal DB becomes and remains "0" for a period of time shorter than one period of the clock CLK, digital output DI from flip-flop FF3 is maintained at the high level, i.e. "1".

In the case of full-wave rectification of the AC power supply AC, the period of time during which the isolated digital signal DB becomes and remains "0" only for a short time is of the order of 2 ms in the case of 50 Hz, for example, which is about 1/10 of one period. Thus, it will suffice to select the period of the clock pulses CLK to be about 4 ms.

FIG. 17 shows another exemplary digital filter ciruit 95 of of FIG. 13 wherein flip-flop FF2 of FIG. 15 is eliminated. Gate circuit G1 is supplied with isolated digital signal DB and the respective outputs from flip-flops FF1 and FF3. Switch SW1 selects either the output Q1 from flip-flop FF1 or the output Q3 from flip-flop FF3 in accordance with the output from gate circuit G1 and applies the selected output to the flip-flop FF3.

FIGS. 18(a)–18(3) show the timing operation of the circuit of FIG. 17 in the case of full-wave rectification. Gate circuit G1 is supplied with isolated digital signal DB, a signal <Q1> (note that <> represents an inverted state as used herein), which is obtained by inverting output Q1 from flip-flop FF1; and output Q3 from flip-flop FF3; and drives switch SW1 in accordance with the result of a logical operation executed using these input signals. The basic operation of the circuit is the same as that of the circuit of FIG. 15.

FIG. 19 depicts another gate circuit G1 used in the circuits of FIGS. 15 and 17, wherein gate circuit G1 comprises three gates so that a driving signal G1 for switch SW1 is outputted from gate circuit G1 according to the following logical expression.

$$G1 = (\overline{DB} \cdot <Q1> \cdot Q2) + (<DB> \cdot \overline{Q1} \cdot <Q2>), \text{ for case of FIG. 15.}$$

$$G1 = (\overline{DB} \cdot <Q1> \cdot D1) + (<DB> \cdot \overline{Q1} \cdot <D1>), \text{ for case of FIG. 17.}$$

By using such gate circuit, a positive (i.e. "1") pulse which is shorter than the clock period can be also processed, and it is possible to remove impulse noise and chattering noise caused by the switch.

FIG. 20 depicts an exemplary digital filter circuit 95 which used when rectifier circuit 93 of FIG. 13 performs half-wave rectification. When rectifier circuit 93 is a half-wave rectifier, the period of time during which isolated digital signal DB becomes and remains "0" is longer than in the case of the full-wave rectification. Accordingly, in this embodiment, the following algorithm of the digital filter is realized.

When isolated digital signal DB becomes "1", i.e. at a high level, the digital signal output DI is set to DI="1". When the isolated digital signal DB remains "0", i.e. at a low level, longer than the period of the AC power supply, the digital signal output DI is set to DI="0". In other cases, the digital signal output DI is not changed, i.e. DI=no change.

In this embodiment, the digital filter comprises a gate circuit G2 which is supplied with isolated digital signal DB and clock pulses CLK, and a monostable multivibrator MFF to which the output signal from gate circuit G2 is applied.

FIGS. 21(a)–21(f) show operation of the digital filter of FIG. 20, wherein gate G2 is supplied with an isolated digital signal DB and clock signals CLK such as those shown in FIG. 21(c) and 21(d), respectively, and outputs a clock pulse that is applied during the period that isolated digital signal DB is at the high level, as shown in FIG. 21(e). Monostable multivibrator MFF, in which is set a pulse width longer than one period of the AC power supply, receives as a trigger signal a pulse signal, such as that shown in FIG. 21(e), which is outputted from gate G2, and outputs a digital signal DI such as that shown in FIG. 21(f).

Since the above circuit may be affected by noise, a noise eliminating circuit, such as that used in FIG. 19, may be used and the isolated digital signal applied therethrough to the embodiment.

FIG. 22 depicts another digital filter circuit 95 which is used when rectifier circuit 93 of FIG. 13 is a half-wave rectifier. In this embodiment, the digital filter comprises a counter CNTR which is supplied at a clear terminal thereof with an isolated digital signal DB and which counts clock pulses CLK, and a flip-flop SRFF which is set by a signal Q which rises when counter CNTR has counted N clock pulses CLK and which is reset when the isolated digital signal DB becomes "1".

Although in the foregoing embodiments, digital filter 4 comprises hardware, the filter can be realized by appropriate use of software. A microprocessor may be used to read an isolated digital signal each predetermined period of time, and a program may be used which executes the same algorithms as the operations executed by the digital filters of FIGS. 15,17,19,20, and 21.

FIG. 23 shows a voltage signal input circuit which is used when a plurality of voltage signals are inputted, wherein a combination of rectifier circuit 93 and signal isolating means 94 is provided to correspond to each input signal, and a single digital filter circuit 95 is used for each input signal in a time-division manner. If digital filter circuit 95 is formed by using an LSI, for example, the cost is reduced substantially.

The above described embodiment attains the following advantages. Since the embodiment does not use large sized, costly parts, such as, transformers, high voltage capacitors,etc, it is possible to reduce the size and cost of such input circuits. Also, since there is no energy storage component required, a high level of safety is attained, and rapid response is attained. Moreover, the circuit can be used for both AC and DC supplies, thus providing flexibility of general purpose usage.

Figure 24:
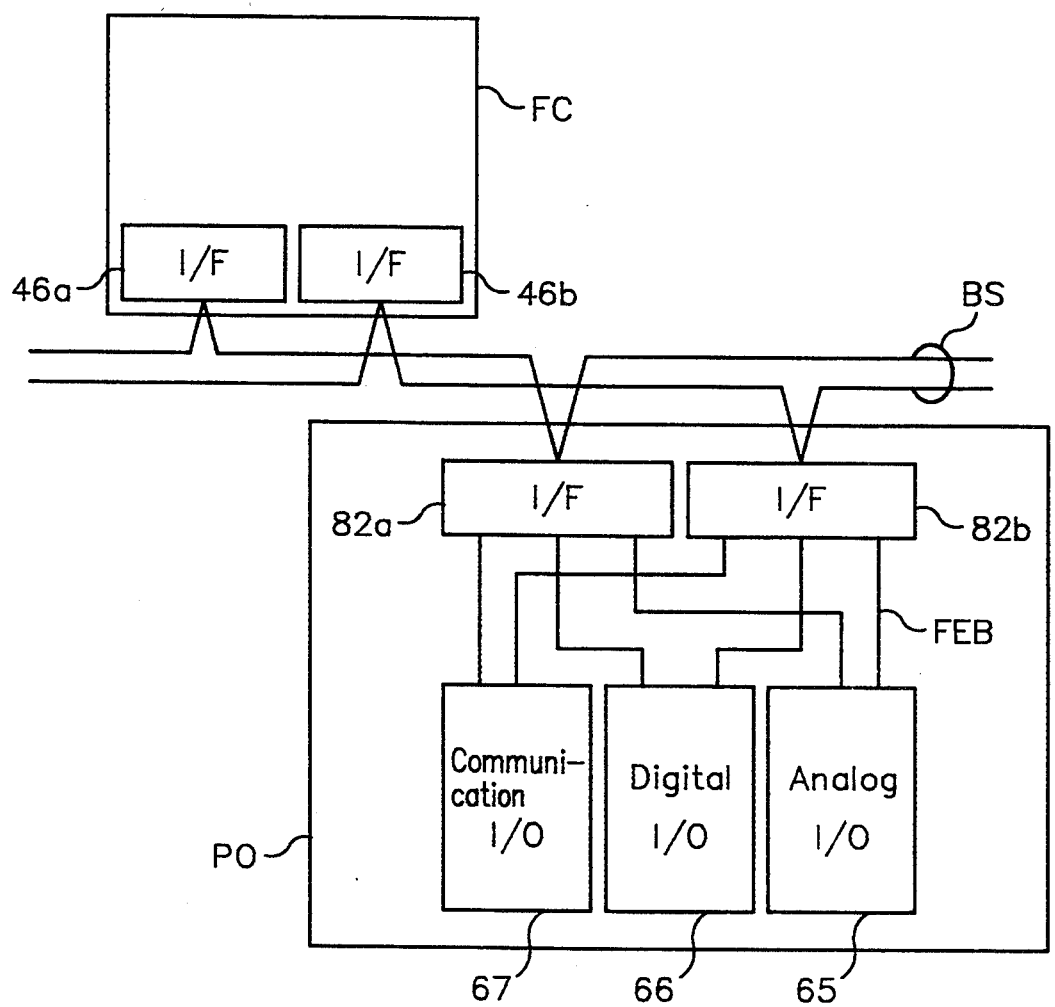
FIG. 24 is a conceptual view depicting an arrangement wherein a double bus connects the control station and remote input/output device.

FIG. 24 shows an arrangement wherein bus BS, connecting station FC and remote I/O device PO, is doubled. In station FC, communication interfaces 46a and 46b are provided to correspond to two bus lines which constitute a double bus BS. Also, in remote I/O device PO, communication interfaces 82a and 82b are provided to correspond to the two bus lines. Normally, data transmission is carried out by alternately using the two lines of bus BS, thereby making it possible to discover immediately any abnormalities in either the bus lines or the communication interfaces. If an abnormality occurs, a normal bus or normal communication interfaces are used to continue the data transmission.

Bus BS is usually connected to a plurality of remote input/output devices PO, although only one such device is illustrated. Accordingly, communication interface 46 in station FC serves as a central master which controls cyclic scan transmission which is carried out between sation FC and each remote I/O device PO.

If station FC, which serves as the central master, breaks down, the communication frame on bus BS is cut off. To solve this problem, communication control involves detecting the occurrence of such failure at the remote I/O device side of the system, and the passing the right to communicate to other remote I/O devices not affected by such failure.

In FIG. 24, remote I/O device PO is provided with an analog unit 65 which handles analog signals, a digital I/O unit 66 which handles digital signals, and a communication I/O unit 67 which handles communication with the outside.

Figure 25:
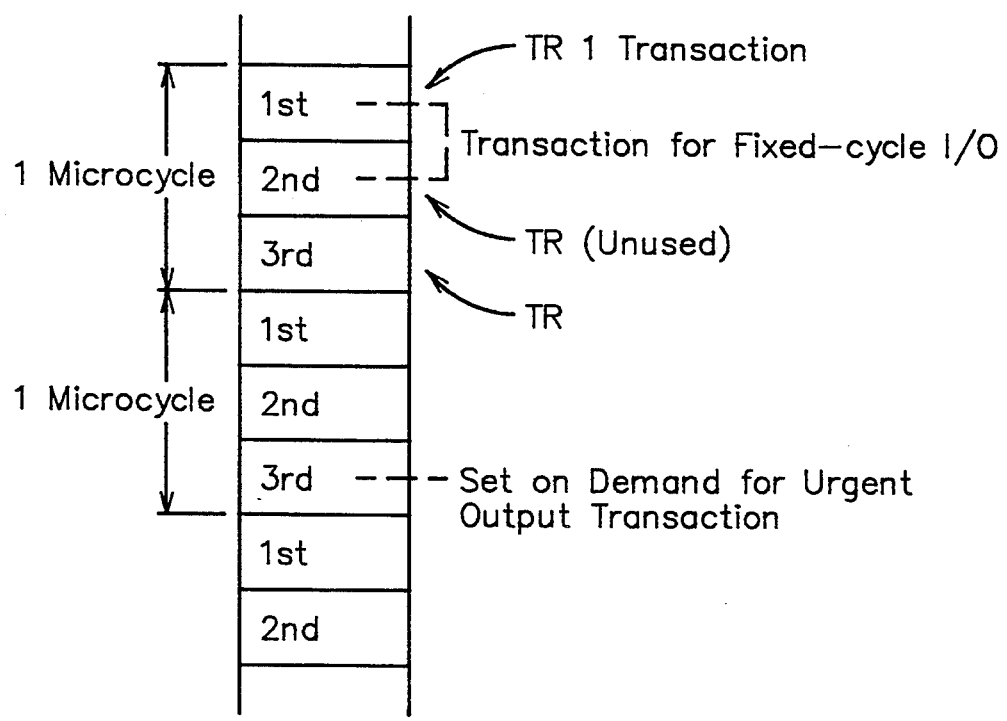
FIG. 25 is a conceptual view depicting a way of processing a communication packet which is sent to an internal bus that connects each of the input/output units and a communication interface in a remote input/output device.

FIG. 25 shows a method of processing a communication packet sent to an internal bus FEB which connections each of I/O units 65,66 and 67 and interface 82 (which is assumed to have a parallel interface) in remote I/O device PO (see FIG. 24).

Cyclic scan transmission is also carried out between each of the I/O units 65,66 and 67 and interface 82 by using internal bus FEB. The cyclic scan transmission is serial communication which is carried out in a minimum unit (called "microcycle") of one cycle for fixed cycle communication between each of the I/O units 65,66,67 and interface 82. Communication of one microcycle comprises three transactions which are the minimum number of units for transmission and reception. Fixed cycle I/O data is set to the first and second transactions for effecting cyclic scan transmission. The third transaction is used for asynchronous processing and usually is not used.

Fixed cycle I/O data transmission, which is carried out by using the first and second transactions, is executed by transmitting a communication packet for fixed cycle I/O data transmission, which has been set to the first and second transactions, in advance, by using command response transmission according to a scheduling table which is determined by the scan cycle which is preset for each I/O node. The scheduling table may be a table for controlling the scan cycle and contain material which describes for each I/O node a scan cycle to access such node.

More specifically, fixed cycle data which is transmitted from each I/O unit to interface 82 is process data, for example, data on temperature, flow rate, pressure, etc, which are collected from the process-field. Such fixed cycle data is set to the first and second transactions and transmitted in that state. Similarly, data which is transmitted from interface 82 to and I/O unit is control output data used to control an actuator, e.g. a valve, which is installed as a control element, and such control output data is set to the first and second transactions and transmitted in such state.

By such cyclic scan transmission, pieces of data which are exchanged between each of the I/O units 65,66,67 and interface 82 are updated and reflected on each other in the fixed cycle. Further, urgent I/O data transmission is handled as asynchronous communication by setting a communication packet for urgent output to command response transmission carried out by using the third transaction of a microcycle communication which is sent immediately after an urgent output request.

More specifically, when communication interface 82 receives information about a matter which should be handled urgently from station FC, for example, a control output which instructs a valve to urgently close, interface 82 sets the urgent output data to the third transaction and sends the data to the I/O unit concerned.

The third transaction is similarly used to transmit urgent information from an I/O unit to station FC through interface 82. Urgent processing which is executed by the third transaction includes ordinary interruption processing.

Thus, all of the three transactions in one microcycle for command response transmission are not used for fixed cycle processing, but one transaction is allotted for asynchronous processing, for example, urgent output, thereby enabling urgent processing to be executed without impairing the collection of ordinary process data and the control output transmission processing despite serial communication.

Figure 26:
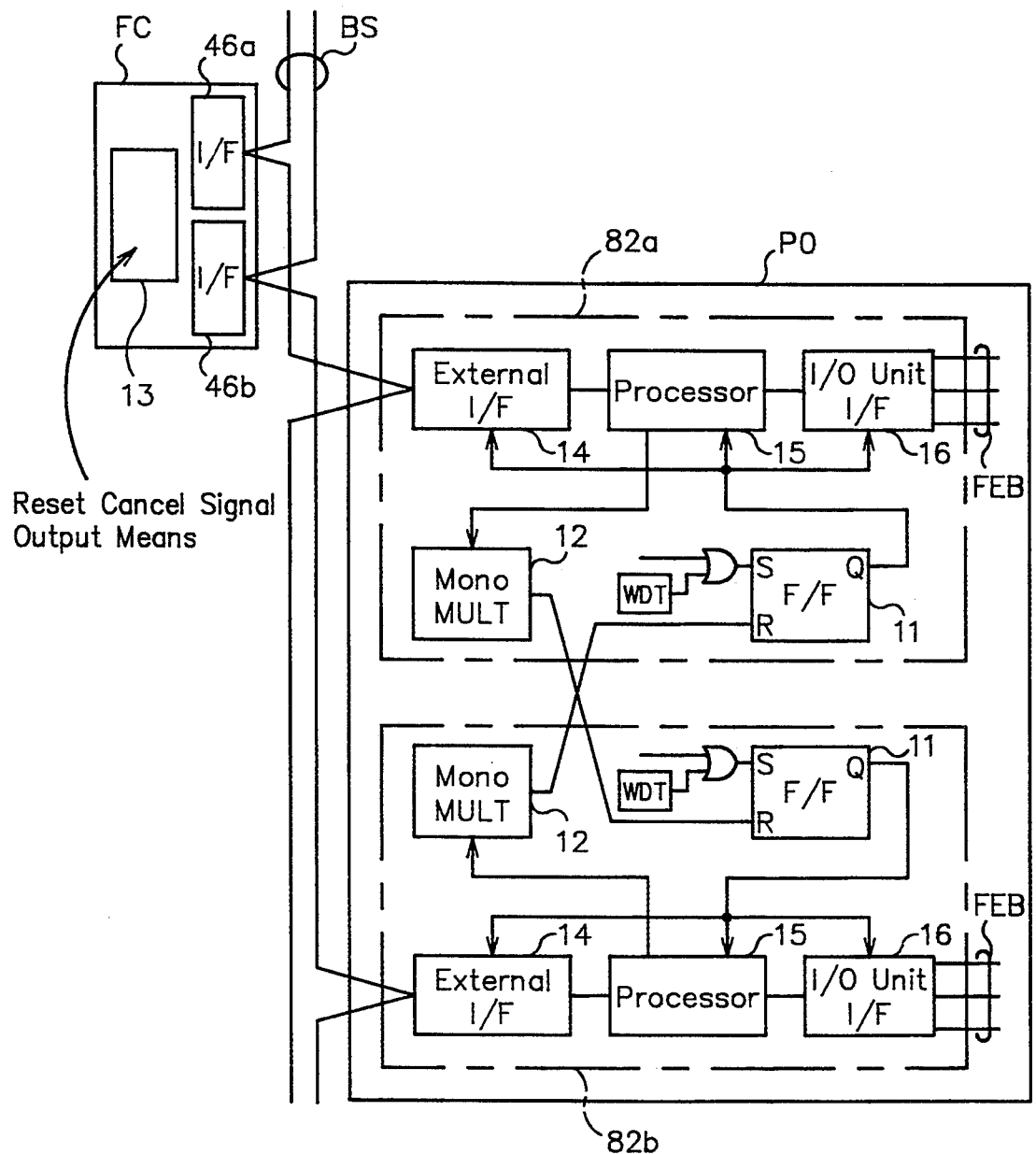
FIG. 26 is a block diagram depicting an arrangement which enables a reset state in a remote input/output device to be cancelled from the control station.

FIG. 26 shows an arrangement wherein a reset state in remote I/O device PO can be cancelled from station FC without the need for providing a special control signal line between station fC and remote I/O device PO. In this arrangement, station FC and remote I/O device PO are connected by a pair of buses, which constitute a double bus BS; and remote I/O device PO is provided with a first communication interface 82a and a second communication interface 82b.

In each interface 82a,82b, a reset signal holding means 11 outputs and holds an internal reset signal upon receiving an abnormality detecting signal which is generated when an abnormality occurs in remote I/O device PO. In the embodiment, reset holding means 11 is formed by using a flip-flop (F/F). A counterpart reset control means 12 receives a reset cancel signal which is sent from station FC through bus BS, and applies the reset cancel signal to reset signal holding means 11 in the other communication interface. The counterpart reset control means 12 is formed by using a monostable multivibrator (MONO MULT), for example.

In station FC, a reset cancel signal output means 13 detects whether either of the first and second interfaces 82a and 82b in remote I/O device PO enters a reset state. When a reset state of one interface is detected, a reset cancel signal is outputted to the other interface which is not in a reset state.

With this arrangement, a reset state in remote I/O device PO can be cancelled from the control station FC without need of providing a special control signal line.

In the FIG. 26 embodiment, first and second communication interfaces 82a and 82b have the same arrangement. An external bus interface 14 is connected to bus BS, and an I/O interface 16 is connected to an I/O unit through an internal bus FEB. Further, a communication control processor 15 is provided between external bus interface 14 and I/O interface 16.

Monostable multivibrator 12, which constitutes a counterpart reset control means, is arranged to receive a signal outplatted from communication control processor 15 and resets the contents of the reset signal holding means, which may be a flip-flop, 11 in the other communication interface.

Reset signal holding means 11 is supplied at a set terminal S with a time up signal from a watch dog timer WDT and other abnormality detecting signal through an OR circuit and also supplied at a reset terminal R with a signal from multivibrator 12 in the other communication interface. The Q output from flip-flop 11 is applied, as an internal reset signal, to the external bus interface 14, communication control processor 15, and I/O interface 16.

In one communication interface, such as 82a, the watch dog timer WDT and an abnormality detecting means, not shown, detect whether or not the internal operation is in a normal condition. If an abnormality occurs, for example, the watch dog time WDT reaches a time up state and outputs a time up signal, or the abnormality detecting means detects the abnormality and outputs an abnormality detecting signal. The time up signal or the abnormality detecting signal is applied to set terminal s of flip-flop 11 through the OR circuit, so that flip-flop 11 is set. Thus, the internal reset signal becomes active so that external bus interface 14, communication control processor 15 and I/O interface 16 are reset. Watch dog time WDT reaches the time up state when the communication control processor 15 has an operation failure and also when transient noise is generated.

Station FC, which is connected to remote I/O device PO through bus BS, usually executes data transmission by scan communication by using either of the two bus lines constituting the double bus BS or by alternately using the two bus lines. When a communication interfaces, such as 82b, which is connected to the bus line being used presently in the station FC enters a reset state such as that described above, no response is obtained from communication interface 82a any longer. Accordingly, station FC recognizes that interface 82a, which has been used so far, has entered a reset state, or that the communication function has stopped, by the fact that no response is obtained. Then, station FC uses the bus line which is connected to the other communication interface, e.g. 82b, thereby continuing the data transmission.

At this time, station FC effects reset cancellation to cancel the reset state on the assumption that interface 82a has been brought into the reset state due to the generation of transient noise.

Command communication for canceling the reset state is carried out by reset cancel signal output means 13 in station FC, using one of the two bus lines, constituting double bus BS, which is connected to second interface 82b. When a reset state cancel signal is applied to second interface 82b, reset control means 12 in the second interface 82b applies a reset signal to reset terminal R of flip-flop 11 in first interface 82a. Thus, flip-flop 11 is reset, so that the reset signal which is outputted therefrom to external interface 14, communication processor 15 and I/O interface 16, is made inactive. Thus, the reset state of these components is cancelled. In this manner, the reset state of interface 82a is cancelled.

The command communication for canceling the rest state is carried out a plurality of times, such as for example 3 times, on the assumption that transient noise is generated frequently, for example. When a reset state cannot be canceled even when the reset cancel communication is carried out a predetermined number of times, interface 82a judges that the cause of the reset state is not transient noise, that is, that some abnormality still remains. Thereafter interface 82a suspends the communication for canceling the reset state, and executes necessary processing, for example, display of a message that interface 82 has some abnormality.

The above arrangement enables the reset state of one of the two communication interfaces (82a,82b) to be canceled by using one of the two bus lines, which constitute the double bus. Thus, the reset state can be canceled from the control station FC.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. In a distributed control system comprising a control station means for controlling operations of the system, a remote input/output bus, and at least one remote input/output device connected to said control station means through said remote input/output bus, wherein cyclic scan transmission is through said remote input/output bus, the improvement comprising continuation transmission service means for transmitting through said remote input/output bus to said at least one remote input/output device, first, an urgent output, and then, for performing cyclic scan transmission after completion of transmission of said urgent output;
initialization start transmission service means for performing cyclic scan transmission of input only;
interruption duration measuring means for measuring a period of interruption of transmission of said remote input/output bus; and
means for effecting control such that when the period of interruption measured by said measuring means is shorter than a predetermined period, said continuation transmission service means is activated, and when said period of interruption measured by said measuring means is longer than said predetermined period, said initialization start transmission service means is activated;
wherein said control station means comprises an output data holding means for holding latest output data transmitted to said at least one remote input/output device, and
wherein said at least one remote input/output device comprises a no-response detecting means for detecting whether or not there is data transmission through said remote input/output bus, and for detecting a time up signal obtained from said control station means.

2. The system of claim 1, wherein said at least one remote input/output device further comprises
default value output means for outputting a signal of a predetermined value to a process as a controlled system when a no-response state continues longer than a predetermined period in communication between said at least one remote input/output device and said control station means.

3. The system of claim 1, wherein said at least one input/output device comprises means for transmitting data; data change detecting means for detecting whether or not there is change in data which is to be transmitted; counter means for counting when said data change detecting means detects a change in data which is to be transmitted; and count adding means for adding a value from said counter means to a signal to be transmitted.

4. The system of claim 3, wherein said control station means comprises means for receiving data; data change recognizing means for recognizing a change in data by detecting a difference between a counter value included in a signal received during a present reception and a counter value included in a signal received during a preceding reception.

5. The system of claim 3, wherein said control station means comprises means for receiving data; data change count recognizing means for detecting either an increment or a decrement of a counter value to thereby recognize a number of times a signal has changed since a preceding communication cycle.

6. The system of claim 1, wherein said control station means comprises
signal sending means for sending a command for processing to be executed at said at least one remote input/output device;
counter means for counting when a processing command is changed; and
counter adding means for adding a value from said counter means to a signal which is to be transmitted; and wherein
said at least one remote input/output device comprises command recognizing means for recognizing that a new processing command has been transmitted to said at least one remote input/output device by detecting a difference between a counter value included in a signal received during a present reception and a counter value included in a signal received during a preceding reception.

7. The system of claim 1, wherein said control station means comprises
signal sending means for sending a command for processing to be executed at said at least one remote input/output device;

counter means for counting when a processing command is changed;

count adding means for adding a value from said counter means to a signal to be transmitted; and transfer confirming means for comparing between a combination of data and counter value, which had been sent back from said at least one remote input/output device, and a combination of data and counter value, which is presently being sent out, thereby to check whether or not data transfer has been effected; and wherein said at least one remote input/output device comprises a command recognizing means for recognizing when a new processing command has been sent to said at least one remote input/output device by detecting a difference between a counter value included in a signal received during present reception and a counter value included in a signal received during a preceding reception; and signal returning means for returning received data and counter value to said control station means by scan communication in a predetermined cycle.

8. The system of claim 1, wherein said at least one remote input/output device comprises rectifier circuit means for rectifying an input voltage signal;

signal isolating means for transmitting a rectified output from said rectifier circuit means after electrically isolating said rectifier circuit means; and digital filter circuit means for removing a short time off signal from an output signal which is transmitted thereto through said signal isolating means, thereby to obtain an isolated digital output signal.

9. In a distributed control system comprising a control station means for controlling operations of the system, a remote input/output bus, and at least one remote input/output device connected to said control station means through said remote input/output bus, wherein cyclic scan transmission is through said remote input/output bus, the improvement comprising continuation transmission service means for transmitting through said remote input/output bus to said at least one remote input/output device, first, an urgent output, and then, for performing cyclic scan transmission after completion of transmission of said urgent output;

initialization start transmission service means for performing cyclic scan transmission for input only;

interruption duration measuring means for measuring a period of interruption of transmission of said remote input/output bus; and means for effecting control such that when the period of interruption measured by said measuring means is shorter than a predetermined period, said continuation transmission service means is activated, and when said period of interruption measured by said measuring means is longer than said predetermined period, said initialization start transmission service means is activated;

wherein said at least one remote input/output device comprises means for performing internal fixed cycle communication, said fixed cycle communication including serial communication carried out in one microcycle, said microcycle being divided into three transactions, a first and a second of said three transactions being allotted for fixed cycle input/output processing, and a third of said three transactions being allotted for asynchronous processing.

10. In a distributed control system comprising a control station means for controlling operaton of the system, a remote input/output bus, and at least one remote input/output device connected to said control station means through said remote input/output bus, wherein cyclic scan transmission is through said remote input/output bus, the improvement comprising continuation transmission service means for transmitting through said remote input/output bus to said at least one remote input/output device, first, an urgent output, and then, for performing cyclic scan transmission after completion of transmission of said urgent output;

initialization start transmission service means for performing cyclic scan transmission for input only;

interruption duration measuring means for measuring a period of interruption of transmission of said remote input/output bus; and means for effecting control such that when the period of interruption measured by said measuring means is shorter than a predetermined period, said continuation transmission service means is activated, and when said period of interruption measured by said measuring means is longer than said predetermined period, said initialization start transmission service means is activated;

wherein said control station means and said at least one remote input/output device is connected by a double bus;

wherein said at least one remote input/output device comprises a first and a second communication face; and wherein each of said first and second communication interfaces comprises means for generating an abnormality detecting signal when an abnormality occurs in said at least one remote input/output device;

reset signal holding means for outputting and holding an internal reset signal in response to receipt of said abnormality detecting signal; and counterpart reset control means for receiving a reset cancel signal from said control station means through said double bus, and for applying said reset cancel signal to said reset signal holding means in one of said first and second communication interfaces.

11. The system of claim 10, wherein said control station means comprises reset cancel signal output means for detecting whether or not either of said first and second communication interfaces enters a reset state, and when a reset state is detected in one communication interface for outputting a reset cancel signal to the other communication interface.

12. The system of claim 11, wherein said rest cancel signal output means comprises means for executing communication for cancellation of a reset state a predetermined number of time.

* * * * *